US007603485B2

(12) United States Patent
Komikado et al.

(10) Patent No.: US 7,603,485 B2
(45) Date of Patent: Oct. 13, 2009

(54) STORAGE SUBSYSTEM AND REMOTE COPY SYSTEM USING SAID SUBSYSTEM

(75) Inventors: Kousuke Komikado, Odawara (JP); Koji Iwamitsu, Odawara (JP); Tetsuya Shirogane, Odawara (JP); Atsushi Ishikawa, Minamiashigara (JP); Takahide Okuno, Odawara (JP); Mitsuhide Sato, Oiso (JP); Toshiaki Minami, Odawara (JP); Hiroaki Yuasa, Ninomiya (JP)

(73) Assignee: Hitachi, Ltd., Tokyo (JP)

( * ) Notice: Subject to any disclaimer, the term of this patent is extended or adjusted under 35 U.S.C. 154(b) by 69 days.

(21) Appl. No.: 11/657,555

(22) Filed: Jan. 25, 2007

(65) Prior Publication Data
US 2008/0126581 A1 May 29, 2008

(30) Foreign Application Priority Data
Nov. 28, 2006 (JP) ............................. 2006-319802

(51) Int. Cl.
*G06F 3/00* (2006.01)
*G06F 9/46* (2006.01)
(52) U.S. Cl. ......................................... 710/5; 718/105
(58) Field of Classification Search .................. 710/5; 718/105
See application file for complete search history.

(56) References Cited
U.S. PATENT DOCUMENTS
5,119,488 A * 6/1992 Takamatsu et al. ............. 714/4

6,792,505 B2 * 9/2004 Otterness et al. ............ 711/114
6,996,070 B2 * 2/2006 Starr et al. .................. 370/252
2001/0049774 A1 12/2001 Otterness et al.
2006/0161707 A1 7/2006 Davies et al.
2006/0224826 A1 * 10/2006 Arai et al. ................... 711/114

FOREIGN PATENT DOCUMENTS
JP 09-146842 11/1995
JP 11-312058 4/1998

* cited by examiner

*Primary Examiner*—Henry W. H. Tsai
*Assistant Examiner*—Juanito C Borromeo
(74) *Attorney, Agent, or Firm*—Stites & Harbison PLLC; Juan Carlos A. Marquez, Esq.

(57) ABSTRACT

Provided is a storage subsystem capable of improving the data processing speed by balancing the load on processors and controllers. This storage subsystem includes a controller for controlling the input and output of data to and from a storage apparatus that provides to a host computer a plurality of logical units to become a storage extent for the host computer to read and write data, processes a command issued by the host computer, and has a storage resource in relation to the logical unit. The controller has a local memory for storing the command, and a processor configured from a plurality of cores for controlling the input and output of data to and from the logical unit to be subject to the input and output of the data based on the command. The local memory stores association information representing the correspondence between the plurality of logical units and the plurality of cores. Each of the plurality of cores processes the command to the logical unit to be handled by a self core based on the association information and executes I/O processing of the data to the logical unit.

20 Claims, 27 Drawing Sheets

FIG.3A

■MEMORY SPACE VIEWED FROM PROCESSOR

| ARD | CTL0 MEMORY MAP (CTL0 PROCESSOR SIDE) | CTL1 MEMORY MAP (CTL1 PROCESSOR SIDE) |
|---|---|---|
| 0x0_00000000-0x0_7FFFFFFF | CT_0 LOCAL MEMORY | CTL1 LOCAL MEMORY |
| 0x0_80000000-0x0_FFFFFFFF | CT_0 BRIDGE REGISTER | CTL1 BRIDGE REGISTER |
| 0x1_00000000-0x1_7FFFFFFF | CT_0 HOST COMMUNICATION PROTOCOL CHIP REGISTER | CTL1 HOST COMMUNICATION PROTOCOL CHIP REGISTER |
| | CT_0 STORAGE APPARATUS COMMUNICATION PROTOCOL CHIP REGISTER | CTL1 STORAGE APPARATUS COMMUNICATION PROTOCOL CHIP REGISTER |
| 0x1_80000000-0x1_FFFFFFFF | CT_0 DATA TRANSFER CONTROL UNIT REGISTER | CTL1 DATA TRANSFER CONTROL UNIT REGISTER |
| 0x2_00000000-0x5_FFFFFFFF | CT_0&1 CACHE MEMORY (INCLUDING EXPANSION (1) TO (3)) | CTL0&1 CACHE MEMORY (INCLUDING EXPANSION (1) TO (3)) |
| 0x6_00000000-0x6_7FFFFFFF | CT_1 LOCAL MEMORY | CTL0 LOCAL MEMORY |
| 0x6_80000000-0x6_FFFFFFFF | CT_1 BRIDGE REGISTER | CTL0 BRIDGE REGISTER |
| 0x7_00000000-0x7_7FFFFFFF | CT_1 HOST COMMUNICATION PROTOCOL CHIP REGISTER | CTL0 HOST COMMUNICATION PROTOCOL CHIP REGISTER |
| | CT_1 STORAGE APPARATUS COMMUNICATION PROTOCOL CHIP REGISTER | CTL0 STORAGE APPARATUS COMMUNICATION PROTOCOL CHIP REGISTER |
| 0x7_80000000-0x7_FFFFFFFF | CT_1 DATA TRANSFER CONTROL UNIT REGISTER | CTL0 DATA TRANSFER CONTROL UNIT REGISTER |

■MEMORY SPACE VIEWED FROM HOST COMMUNICATION PROTOCOL CHIP

| ARD | CTL0 MEMORY MAP (CTL0 HOST COMMUNICATION PROTOCOL CHIP SIDE) | CTL1 MEMORY MAP (CTL1 HOST COMMUNICATION PROTOCOL CHIP SIDE) |
|---|---|---|
| 0x0_00000000-0x0_7FFFFFFF | CT_0 LOCAL MEMORY | CTL1 LOCAL MEMORY |
| 0x0_80000000-0x0_FFFFFFFF | CT_1 LOCAL MEMORY | CTL0 LOCAL MEMORY |
| 0x1_00000000-0xF_7FFFFFFF | CT_0&1 CACHE MEMORY (INCLUDING EXPANSION (1) TO (3)) | CTL0&1 CACHE MEMORY (INCLUDING EXPANSION (1) TO (3)) |

31A / 31B / 31C

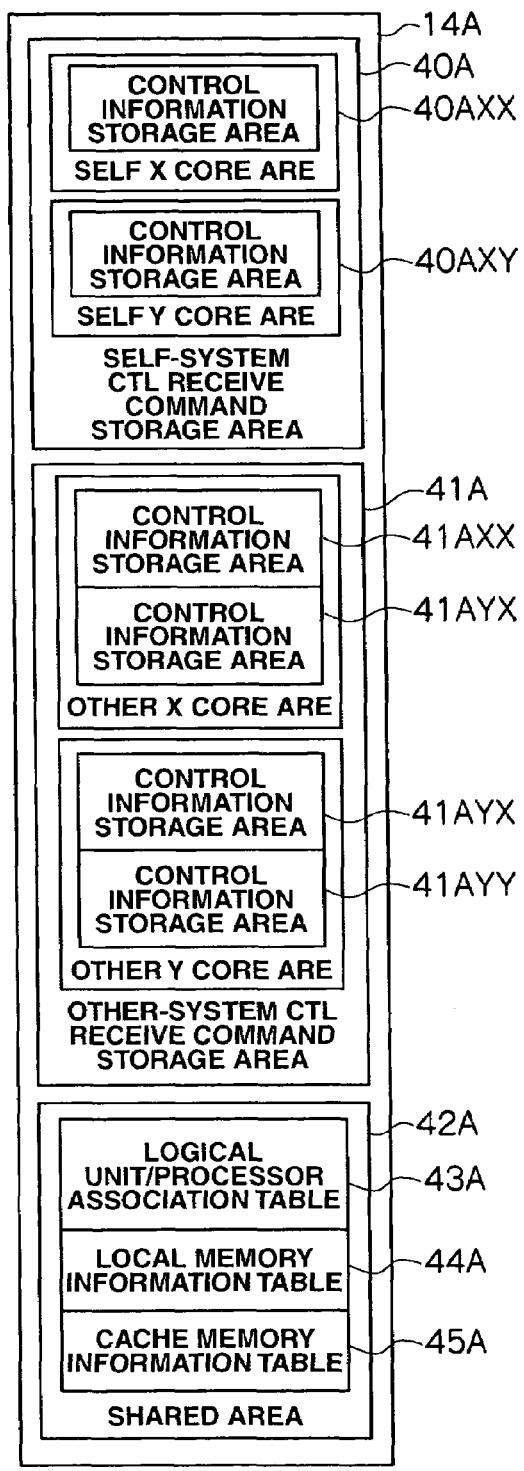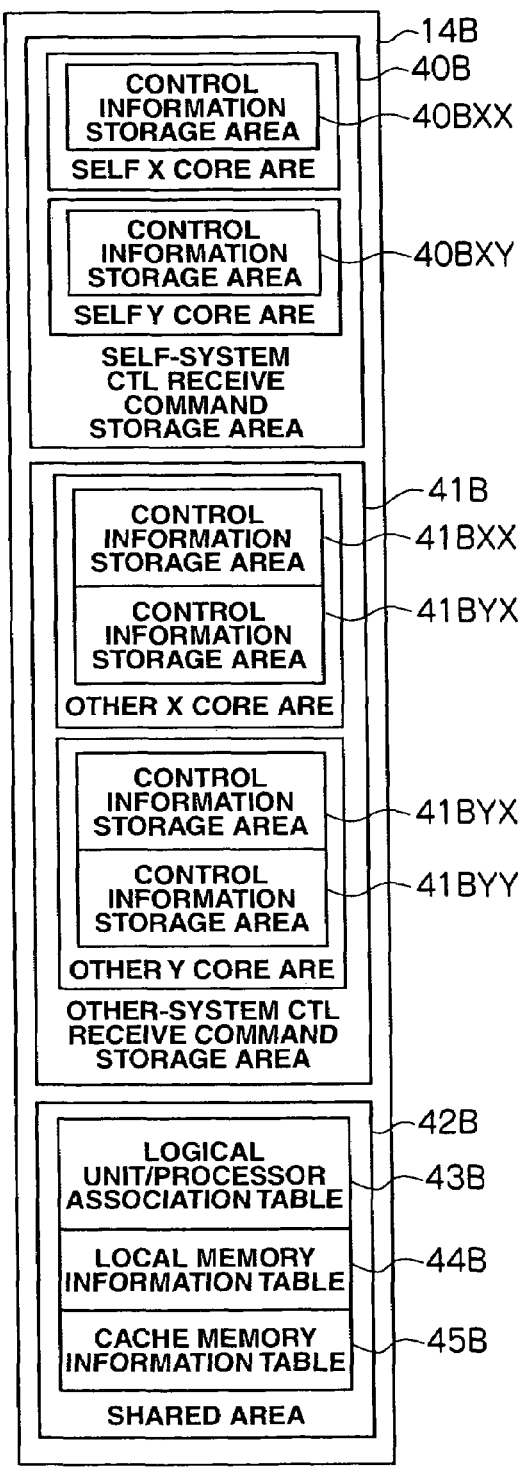

FIG.6

| LU# | ASSOCIATED CONTROLLER # | ASSOCIATED CORE # | SUBSTITUTE CORE # | PROCESSING FLAG |
|---|---|---|---|---|
| 0 | CTL0 | X0 | X1 | HOST 0-0 |
| 1 | CTL1 | X1 | X0 | HOST 0-1 |
| 2 | CTL0 | Y0 | Y1 | HOST 1-0 |
| 3 | CTL1 | Y1 | Y0 | HOST 0-2 |
| 4 | CTL0 | X0 | X1 | HOST 0-3 |
| 5 | CTL1 | X1 | X0 | HOST 1-1 |
| 6 | CTL0 | Y0 | Y1 | HOST 1-2 |
| 7 | CTL1 | Y1 | Y0 | HOST 1-3 |
| ... | ... | ... | ... | ... |
| 43C | 43D | 43E | 43F | 43G |

| MEMORY | CORE | MEMORY ADDRESS AREA | SEGMENT BLOCK | TOP SEGMENT ADDRESS | OPEN FLAG |
|---|---|---|---|---|---|
| LM0 | X0 | A000-A999 | a | A000 | 0 |
| | | | b | A100 | 1 |
| | | | c | A200 | 0 |
| | | | ... | ... | ... |
| | Y0 | B000-B999 | d | B000 | 1 |
| | | | e | B100 | 1 |
| | | | F | B200 | 0 |
| | | | ... | ... | ... |
| LM1 | X1 | C000-C999 | g | C000 | 1 |
| | | | h | C100 | 0 |
| | | | i | C200 | 0 |
| | | | ... | ... | ... |
| | Y1 | D000-D999 | j | D000 | 1 |
| | | | K | D100 | 0 |
| | | | l | D200 | 0 |
| | | | ... | ... | ... |
| 44C1 | 44C2 | 44D | 44E | 44F | 44G |

| MEMORY | MEMORY ADDRESS AREA | SEGMENT BLOCK | TOP SEGMENT ADDRESS | TIME STAMP | DIRTY FLAG |
|---|---|---|---|---|---|
| CM0 | CA000-CA999 | A | CA000 | aa:aa | 1 |
| | | B | CA100 | bb:bb | 0 |
| | | C | CA200 | cc:cc | 0 |
| | | ... | ... | ... | ... |
| CM1 | CB000-CB999 | D | CB000 | dd:dd | 1 |
| | | E | CB100 | ee:ee | 0 |
| | | F | CB200 | ff:ff | 1 |
| | | ... | ... | ... | ... |
| 45C | 45D | 45E | 45F | 45G | 45H |

45A(45B)

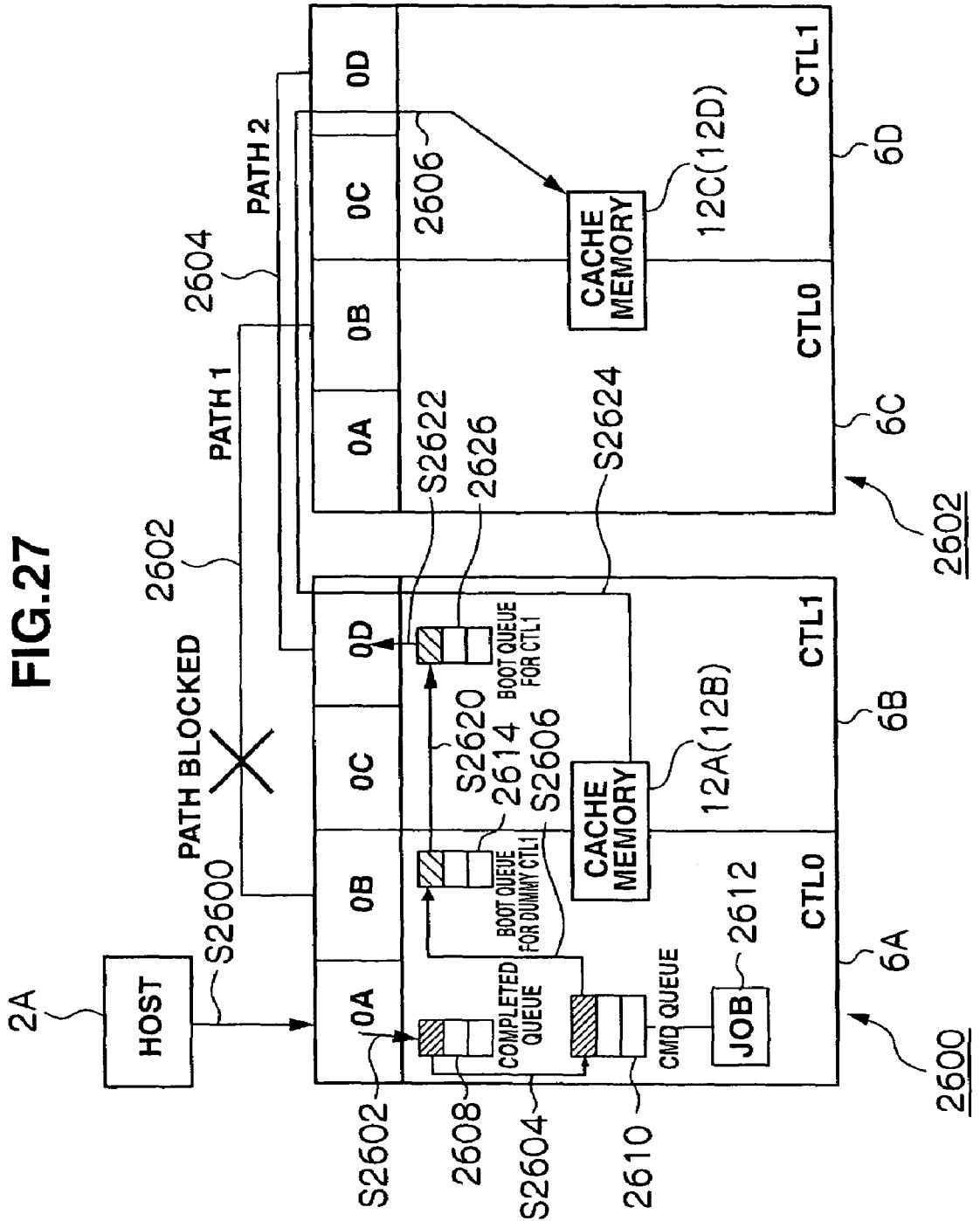

STORAGE SUBSYSTEM AND REMOTE COPY SYSTEM USING SAID SUBSYSTEM

CROSS REFERENCES

This application relates to and claims priority from Japanese Patent Application No. 2006-319802, filed on Nov. 28, 2006, the entire disclosure of which is incorporated herein by reference.

BACKGROUND

The present invention generally relates to a storage subsystem, and particularly relates to a storage subsystem in which a microprocessor for controlling an I/O request of information from a host computer is configured from a plurality of cores.

A storage subsystem is configured by comprising a storage apparatus, and a controller for mediating the data processing between the storage apparatus and a host computer as an upper-level device. In addition to a storage subsystem where the controller and the storage apparatus are housed in the same case, there are types where the controller and the storage apparatus are connected via a communication means, and types that are configured as separate cases. A storage subsystem provides to a host computer a plurality of logical units to become a storage extent for the host computer to read and write data, and the controller mediates and controls the input and output of data between the host computer and the storage apparatus.

Conventionally, a storage subsystem has been demanded of higher reliability and faster response in the data processing with the host computer. Thus, technology is known where a storage subsystem comprises a plurality of controllers, and such plurality of controllers are used to redundantly store data so as to distribute and execute data processing thereby.

Japanese Patent Laid-Open Publication No. H9-146842 discloses technology for executing processing based on a command received by one controller with both processors; namely, a processor comprising the controller that received the command, and a processor comprising the other controller. Japanese Patent Laid-Open Publication No. H11-312058 also describes a storage subsystem comprising a dual controller configuration.

SUMMARY

The foregoing documents describe a storage subsystem comprising multiplexed controllers. The processor of each controller is associated with a logical unit (logical volume), and, upon receiving a command targeting a non-associated logical volume, it requests processing to the processor associated with such logical volume.

Nevertheless, with this storage subsystem, even when the controller receives a command targeting a non-associated logical volume from the host computer, the data transfer between the host computer and the cache memory based on such command is processed with the processor in the controller that received the command. Thus, with the foregoing storage subsystem, when the number of commands received between a plurality of multiplexed controllers becomes biased, there is a problem in that the load will be concentrated on the controller that received numerous commands.

Further, with the foregoing storage subsystem, when the controller receives a command targeting a non-associated logical volume, that controller will have to analyze the command and communicate with the controller associated to such logical volume so as to request such controller to perform processing according to the command, and there is a problem in that the controller that received the command targeting the non-associated logical volume will be burdened with an unnecessary load, and the processing time of the overall storage subsystem in response to the command will be delayed. Accordingly, with the foregoing storage subsystem, in order to speed up the processing time of the overall subsystem in response to the command, it is necessary to set the host computer to issue commands to microprocessors and controllers associated with the target logical volume, and there is a problem in that much labor and time are required for such setting process.

Thus, an object of the present invention is to provide a storage subsystem capable of improving the data processing speed by balancing the load in the processor and controller.

In other words, an object of the present invention is to propose a storage subsystem for speeding up the processing time in response to a command in a simple manner while reducing the load of the controller that received a command targeting a non-associated logical volume.

Specifically, one aspect of the present invention provides a storage subsystem for providing to a host computer a plurality of logical units to become a storage extent for the host computer to read and write data, and which includes a controller for processing a command issued by the host computer and thereby controlling the input and output of data to and from a storage apparatus having a storage resource in relation to the logical unit. The controller comprises a local memory for storing the command, and a processor configured from a plurality of cores for controlling the input and output of data to and from the logical unit to be subject to the input and output of the data based on the command. The local memory stores association information representing the correspondence between the plurality of logical units and the plurality of cores. Each of the plurality of cores processes the command to the logical unit to be handled by a self core based on the association information and executes I/O processing of the data to the logical unit.

Further, another aspect of the present invention provides a storage subsystem for controlling the input and output of data to and from a plurality of logical units between a host computer as an upper-level device, and a storage apparatus that provides the logical units configured from a storage extent for reading and writing data from and in the host computer. This storage subsystem comprises a plurality of controllers respectively having a local memory for retaining a command given from the host computer, and a processor for controlling the input and output of data to and from the corresponding logical unit based on the command retained in the local memory, and an inter-controller connection path for connecting the plurality of controllers in a communicable state. The local memory stores association information representing the correspondence of the logical units and the controllers, and address information of the local memory in each of the controllers of a self-system and another-system. Upon receiving a command sent from the host computer, the controller determines whether the target logical unit is associated with the controller of a self-system or another-system based on the association information, and, when the logical unit is associated with the other-system controller, transfers and stores the command to and in the corresponding other-system controller based on the address information. A storage extent for retaining the command of each of the local memories of the self-system and other-system controller is configured from a queue structure, the queue structure comprises a receive queue for retaining the command received by from the host computer, and a command queue for retaining the command for the processor to access a logical unit designated in the command among the plurality of logical units.

According to the present invention, it is possible to realize a storage subsystem capable of improving the data processing speed by balancing the load in the processor and controller.

DESCRIPTION OF DRAWINGS

FIG. 3A is a chart showing an example of a memory space to be recognized by the 0-system and 1-system microprocessors, and FIG. 3B is a chart showing an example of a memory space to be respectively recognized by the 0-system and 1-system host communication protocol chips 10A, 10B;

FIG. 4A is a conceptual diagram showing the memory configuration of a 0-system local memory, and FIG. 4B is a conceptual diagram showing the memory configuration of a 1-system local memory;

FIG. 6 is a conceptual diagram showing the configuration of a logical unit/processor association table;

FIG. 8 is a conceptual diagram showing the configuration of a local memory information table;

FIG. 9 is a conceptual diagram showing the configuration of a cache memory information table;

FIG. 27 is a block diagram showing another embodiment of a remote copy system.

DETAILED DESCRIPTION

Figure 1:
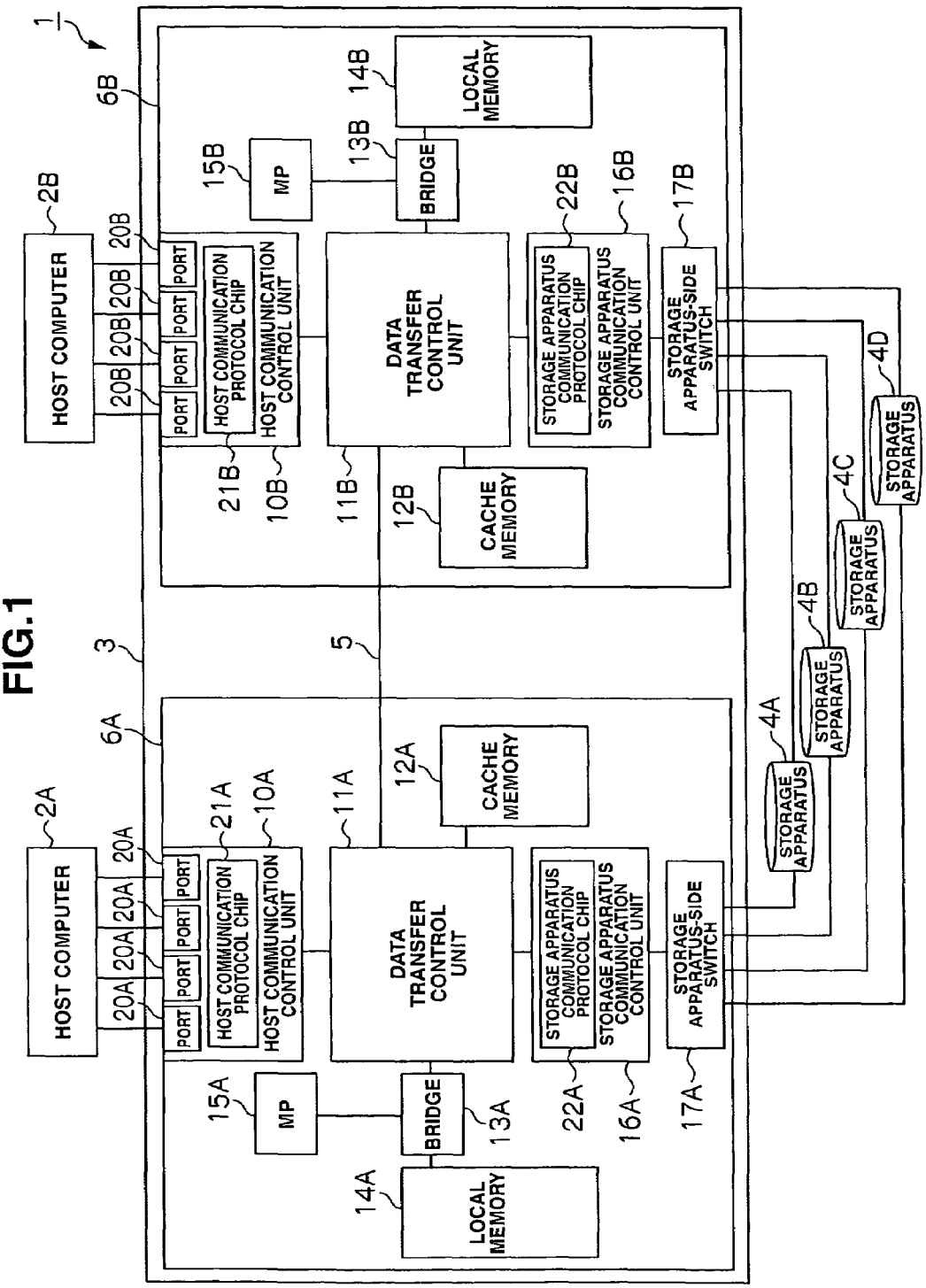
FIG. 1 is a block diagram showing the configuration of a storage system according to an embodiment of the present invention.

FIG. 1 shows a storage system comprising the storage subsystem according to the present invention. The storage system 1 is configured by host computers 2A, 2B being connected to a plurality of storage apparatuses 4A to 4D via a storage subsystem 3. The storage subsystem is also referred to as a storage controller.

The host computers 2A, 2B, for instance, are computers comprising information processing resources such as a CPU (Central Processing Unit) and a memory, and are specifically configured from a personal computer, a workstation, a mainframe or the like. The host computers 2A, 2B are provided with a communication port (for example, a port provided to a LAN card or a host bus adapter) for accessing the storage controller 3, and are able to send a data I/O request command to the storage subsystem 3 via this communication port.

The storage subsystem 3 is configured from 0-system and 1-system controllers 6A, 6B respectively connected to different host computers, and an inter-controller connection path 5 for connecting these controllers 6A, 6B in a communicable state.

As the inter-controller connection path 5, for instance, a bus based on a PCI (Peripheral Component Interconnect)-Express standard for realizing high-speed data communication where the data transfer volume per direction of one lane (maximum of 8 lanes) is 2.5 [Gbit/sec] is used. The transfer of data and various information between the 0-system and 1-system controllers 6A, 6B as described above is all conducted via the inter-controller connection path 5.

The respective controllers 6A, 6B are used for controlling the reading and writing of data from and in the storage apparatuses 4A to 4D according to a request from the host computers 2A, 2B respectively connected to a self controller, and comprise host communication control units 10A, 10B, data transfer control units 11A, 11B, cache memories 12A, 12B, bridges 13A, 13B, local memories 14A, 14B, microprocessors 15A, 15B, storage apparatus communication control units 16A, 16B, storage apparatus-side switches 17A, 17B, and the like. Among the above, the host communication control units 10A, 10B are interfaces for performing communication control with the host computers 2A, 2B, and have a plurality of communication ports 20A, 20B, and host communication protocol chips 21A, 21B.

The communication ports 20A, 20B are used for connecting the controllers 6A, 6B to a network or the host computers 2A, 2B, and, for instance, are respectively allocated with a unique network address such as an IP (Internet Protocol) address or a WWN (World Wide Name).

The host communication protocol chips 21A, 21B perform protocol control during communication with the host computers 2A, 2B. Thus, as the host communication protocol chips 21A, 21B, for example, a fibre channel conversion protocol chip is used when the communication protocol with the host computers 2A, 2B is a fibre channel (FC: Fibre Channel) protocol, and an iSCSI protocol chip is used when the communication protocol is an iSCSI protocol. In other words, an adequate protocol chip is applied to the communication protocol with the host computers 2A, 2B.

Further, the host communication protocol chips 21A, 21B are equipped with a multi CPU function for enabling the communication between a plurality of microprocessors, and the host communication protocol chips 21A, 21B are thereby able to communicate with both the microprocessor 15A in the 0-system controller 6A and the microprocessor 15B in the 1-system controller 6B. The foregoing host communication protocol chips 21A, 21B are able to access the host communication protocol chips 21B, 21A of another-system controller, boot the other-system host communication protocol chip and boot access other host computers or other storage subsystem connected to the other-system controller via the port of the other-system controller. Needless to say, this does not preclude the adoption of a host communication protocol chip that does not comprise a multi CPU function.

The data transfer control units 11A, 11B have a function for controlling the data transfer between the 0-system and 1-system controllers 6A, 6B and the data transfer between the respective elements in the 0-system controller 6A or the 1-system controller 6B. Further, the data transfer control units 11A, 11B have a function for duplicating (copying) the write data provided from the host computers 2A, 2B in the designated cache memories 12A, 12B based on a command from the self-system microprocessors 15A, 15B. Specifically, when the 0-system microprocessor 15A or the 1-system microprocessor 15B stores data in the self-system cache memories 12A, 12B, it also writes this data in the other-system cache memories 12B, 12A (dual writing).

Moreover, in order to make the information stored in the shared areas 32A, 32B (FIG. 2) of the self-system and other-system local memories 14A, 14B constantly the same, when information in one of the shared areas 32A, 32B is updated, the data transfer control units 11A, 11B similarly update the information in the other shared area 32B or 32A.

The bridges 13A, 13B are relay devices for connecting the self-system microprocessors 15A, 15B and the local memories 14A, 14B to the self-system data transfer control units 11A, 11B, respectively, and extract only corresponding data among the data flowing through the bus connecting the host communication control units 10A, 10B, the data transfer control units 11A, 11B, the storage apparatus communication control units 16A, 16B, and the cache memories 12A, 12B, and transfer such corresponding data to the microprocessors 15A, 15B and the local memories 14A, 14B.

The microprocessors 15A, 15B respectively have a function for governing the operational control of the overall self-system controllers 6A, 6B. These microprocessors 15A, 15B, as described later, perform processing such as reading and writing data from and in a logical volume that is exclusively allocated to Oneself in advance (this is hereinafter referred to as an "associated logical volume") according to a write command or a read command stored in the local memories 14A, 14B.

The respective processors 15A, 15B are configured by comprising a plurality of execution cores (computer engines). The associated logical volume is allocated to each core. In the example shown in FIG. 1, the processor 15A comprises an X core 15AX and a Y core 15AY, and the processor 15B also comprises an X core 15BX and a Y core 15BY. Each core executes in parallel a plurality of software threads in an appropriate software environment. The operating system recognizes each core as an independent microprocessor comprising an execution resource. Although the following explanation is regarding the processor, sections that do not refer to the respective cores of such processor should be understood to be an explanation of the overall processor without differentiating the respective cores. Needless to say, the operation of the processor is assigned to the respective cores, or executed in parallel by the respective cores.

The allocation of such associated logical volume to the respective microprocessors 15A, 15B can be dynamically changed depending on the load status of the respective microprocessors 15A, 15B, or based on the reception of an associated core designation command designating the associated core for each logical volume provided from the host computers 2A, 2B. Further, the allocation of the associated logical volume to the respective microprocessors 15A, 15B can be dynamically changed based on the failure status in the connection path between the storage controller 3 and the host computers 2A, 2B, or the connection path between the storage controller 3 and the storage apparatuses 4A to 4D.

The local memories 14A, 14B are used for storing various control programs, and for temporarily retaining various commands such as read commands and write commands provided from the host computers 2A, 2B. The microprocessors 15A, 15B process the read commands and write commands stored in the local memories 14A, 14B in the order they were stored in such local memories 14A, 14B. Micro programs for controlling the microprocessor itself are stored in a memory on the microprocessor side.

Figure 2:
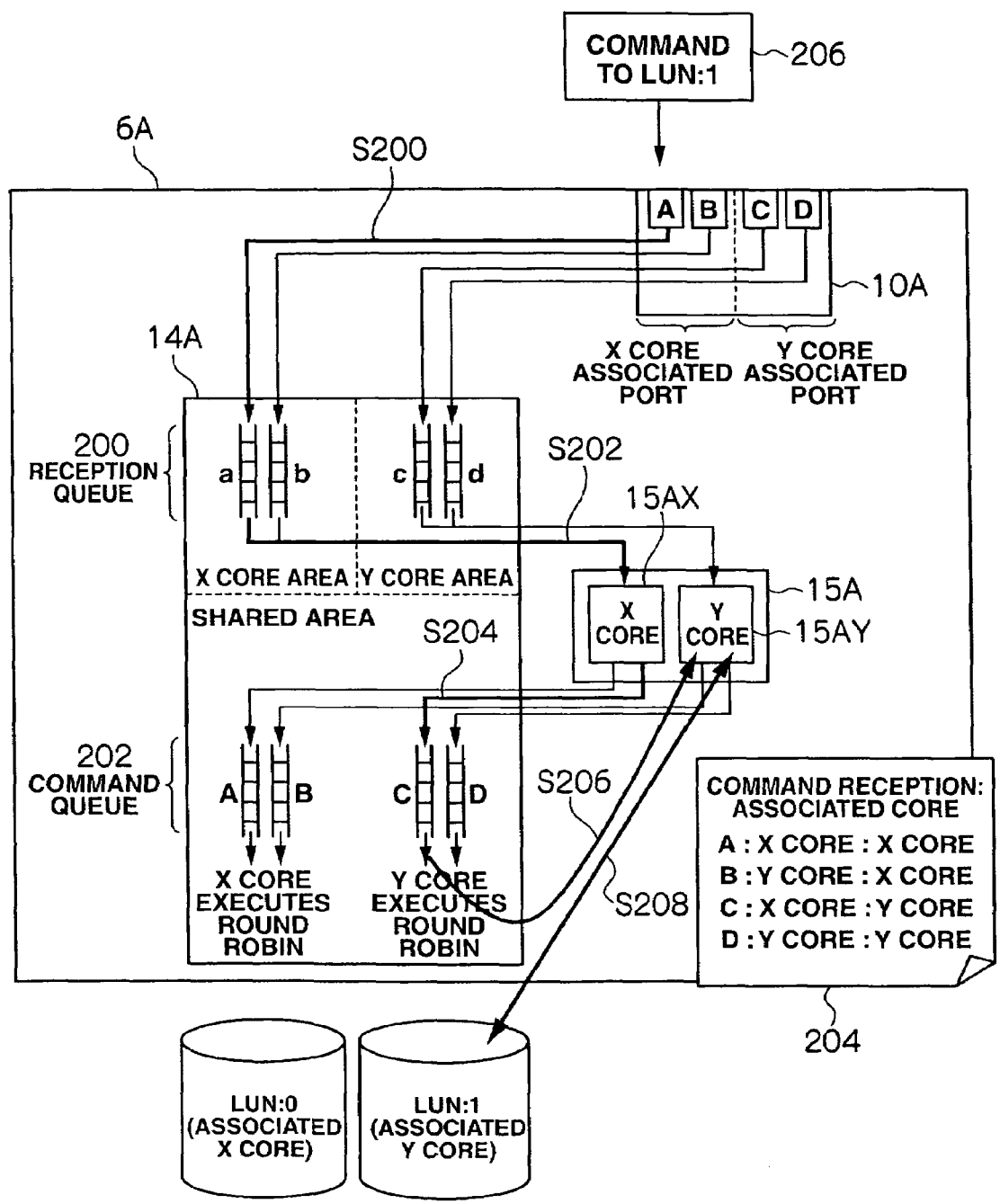
FIG. 2 is a block diagram showing the processing operation between a microprocessor and a queue memory centered around a self-system controller shown in FIG. 1, and explains the processing operation concerning the respective cores of a processor.

The local memories 14A, 14B comprise a queue structure for processing the commands set from the host computer in order. This is now explained in detail with reference to FIG. 2. FIG. 2 is a block diagram providing an explanation mainly on the local memory 14A and the processor 15A in the controller 6A. The other-system controller 6B, the inter-controller connection path 5 connected to this other-system controller, and the storage apparatuses 4A to 4D are omitted in FIG. 2. The following explanation on the local memory 6A can be applied to the other-system local memory 6B without change.

The local memory 14A comprises a queue structure as described above. The queue structure comprises a receive queue 200 for a protocol chip to store a receive command from the host computer received by the host communication protocol chip 21A of the host communication control unit 10A, and a command queue 202 for storing commands to be processed by the X core 15AX or the Y core 15AY of the processor 15A.

Receive queues a to d are set regarding each port of a plurality of ports A to D in relation to the host computer 2A in the host communication control unit 10A. The receive queue a stores commands issued to the port A from the host computer 2A. The receive queue b stores commands issued to the port B from the host computer 2A. The receive queue c stores commands issued to the port C from the host computer 2A.

The receive queue d stores commands issued to the port D from the host computer 2A. This storage is conducted by the host communication protocol chip 21A.

The receive queue a and the receive queue b are processed with the X core 15AX. The receive queue c and the receive queue d are processed with the Y core 15AY. In other words, the associated core is determined for each receive queue. This determination is recorded in the local memory 14A described later. The port A and the port B of the host communication control unit 10A are handled by the X core 15AX. The port C and the port D of the host communication control unit 10A are handled by the Y core 15AY. The X core 15AX and the Y core 15AY read commands from the receive queue that it is personally handling in order, analyzing whether one of the commands is a command to the logical unit LU, or a command to be executed by one of the cores, and stores such command in the corresponding command queue.

The queue A and the queue B of the command queue 202 are queues storing commands to the logical unit LU0. The queue C and the queue D of the command queue 202 are queues storing commands to the logical unit LU1. Processing of the read or write commands to the logical unit LU0 is handled by the X core 15AX. Processing of commands to the logical unit LU1 is handled by the Y core 15AY.

Storage of commands in the command queue A and the command queue C is performed by the X core 15AX. Storage of commands in the command queue B and the command queue D is performed by the Y core 15AY. To summarize which core performs the storage of commands in the command queues A to D and which core handles the processing of commands stored in the command queues A to D, this is as per the characteristic table stored in the local memory 14A described above as reference number 204 of FIG. 2.

Like this, since each logical unit is allocated to each core, the X core and the Y core will not compete against each other regarding the processing to the same logical unit LU in the targeted IO processing, and the X core and the Y core independently process the IO access from different logical units LU to the host. Thus, for instance, it will be possible to avoid a situation where the Y core not subject to any processing load having to wait for the processing of the X core to the LU0 is finished, and the controller will be able to perform commands from the host computer with high speed and high efficiency.

Returning to the explanation with reference to FIG. 1, the cache memories 12A, 12B are primarily used for temporarily storing data transferred between the host computers 2A, 2B and the storage apparatuses 4A to 4D, or between the 0-system and 1-system controllers 6A, 6B.

The storage apparatus communication control units 16A, 16B are interfaces for controlling the communication with the respective storage apparatuses 4A to 4D, and comprise storage apparatus communication protocol chips 22A, 22B. As the storage apparatus communication protocol chips 22A, 22B, for instance, an FC protocol chip can be used when applying an FC hard disk drive as the storage apparatuses 4A to 4D, and a SAS protocol chip can be used when applying a SAS hard disk drive as the storage apparatuses 4A to 4D. Further, when applying a SATA hard disk drive as the storage apparatuses 4A to 4D, the FC protocol chip or the SAS protocol chip can be used as the storage apparatus communication protocol chips 22A, 22B, and configured to be connected to the SATA hard disk drive via a SATA protocol conversion chip.

The storage apparatus-side switches 17A, 17B are switches for switching the storage apparatuses 4A to 4D to become the communication counterpart, and, for instance, a SAS-Expander or an FC loop switch can be used. Further, as a substitute of the storage apparatus-side switches 17A, 17B, for example, the configuration may use the FC loop to connect to the storage apparatuses 4A to 4D.

The storage apparatuses 4A to 4D, for instance, are configured as a disk array device mounted with a plurality of hard disk drives; specifically, FC hard disk drives, SAS hard disk drives and/or SATA hard disk drives. A plurality of logical units as logical storage extents for reading and writing data can be set in the storage extent provided by such plurality of hard disk drives.

When setting the logical units, the reliability and response can be improved by applying RAID technology among the plurality of storage apparatuses 4A to 4D. Specifically, various RAID levels such as "RAID 0", "RAID 1", "RAID 3", "RAID 5", "RAID 6" or "RAID 0+1" can be set for each logical unit.

Further, as the storage device to be mounted on the storage apparatuses 4A to 4D, in substitute for the hard disk drives, a semiconductor memory such as a flash memory, or an optical disk device can be used. As the flash memory, a first type that is inexpensive with a relatively slow write speed and a low write cycle, or a second type that is expensive and capable of write command processing that is faster than the first type, and with a greater write cycle than the first type can be used. In addition, such first and/or second type of flash memory can be mounted together with a hard disk drive to configure a storage device to be used in the storage apparatuses 4A to 4D.

The command processing performed in the storage subsystem 3 of the storage system 1 is now explained. In the case of this storage system 1, the memory space of the respective controllers 6A, 6B of the 0-system and 1-system configuring the storage subsystem 3 is mapped with the memory area in the self-system controllers 6A, 6B, as well as the memory area in the other-system controllers 6B, 6A, respectively. Thereby, the 0-system and 1-system controllers 6A, 6B are able to directly access the memory area in the other-system controllers 6B, 6A.

When the microprocessors 15A, 15B in the 0-system and 1-system controllers 6A, 6B are given a write command or a read command from the host computers 2A, 2B targeting the logical unit allocated to the other-system controllers 6B, 6A, they write such write command or read command in the other-system local memories 14B, 14A so as to transfer the same to the other-system controllers 6B, 6A.

Like this, with the storage system 1, when a write command or a read command to be executed by the other-system controllers 6B, 6A is given from the host computers 2A, 2B to the 0-system controller 6A or the 1-system controller 6B, since such write command or read command is relayed by being directly written in the other-system local memories 14B, 14A, the 0-system and 1-system controllers 6A, 6B are not required to communicate with each other to transfer the write command or the read command, and the write command processing or the read command processing can be performed faster as a result.

Here, FIG. 3A shows a memory map of the memory space to be recognized respectively by the microprocessors 15A, 15B of the 0-system (CTL0) and the 1-system (CTL1), and FIG. 3B shows a memory map of the memory space to be recognized respectively by the 0-system and 1-system host communication protocol chips 10A, 10B.

In FIG. 3A, the memory space recognized by the 0-system microprocessor 15A is a memory space configured from a storage extent (extent of address area stored in the "ADR" field 30A) provided respectively by the memory or register registered in the field 30A of the "CTL0 Memory Map (CTL0 processor)", and the memory area recognized by the 1-system microprocessor 15B is a memory space configured from a storage extent (extent of address area stored in the "ADR" field 30A) provided respectively by the memory or register registered in the field 30C of the "CTL1 Memory Map (CTL1 processor)".

Further, in FIG. 3B, the memory space recognized by the 0-system host communication protocol chip 10A is a memory space configured from a storage extent (extent of address area stored in the "ADR" field 31A) provided respectively by the memory or register registered in the field 31A of the "CTL0 Memory Map (CTL0 host communication protocol chip)", and the memory area recognized by the 1-system host communication protocol chip 10B is a memory space configured from a storage extent (extent of address area stored in the "ADR" field 31A) provided respectively by the memory or register registered in the field 31C of the "CTL1 Memory Map (CTL1 host communication protocol chip)".

Among the memory map data in FIG. 3A and FIG. 3B, the address ("0x0_00000000-0x0_7FFFFFFF") of the self-system local memories 14A, 14B and the address ("0x0_80000000-0x0_FFFFFFFF") of the self-system bridges 13A, 13B are respectively stored in advance as first address information in a flash memory not shown connected to the self-system microprocessors 15A, 15B, and the other addresses shown in FIG. 3A are stored in advance as second address information in a register not shown provided in the self-system data transfer control units 11A, 11B.

The respective microprocessors 15A, 15B of the 0-system and the 1-system are able to respectively recognize the memory space as illustrated in FIG. 3A and FIG. 3A based on the first and second address information stored in the flash memory and the register. Based on the results of such recognition, in addition to the local memories 14A, 14B and the cache memories 12A, 12 in the self-system, the [microprocessors 15A, 15B] are also able to access the local memories 14A, 14A and the cache memories 12B, 12A of the other-system.

Meanwhile, FIG. 4A and FIG. 4B respectively show the memory configuration of the local memories 14A, 14B in the 0-system and 1-system controllers 6A, 6B. As shown in FIG. 4A and FIG. 4B, with the storage system 1, the storage extent of the 0-system and 1-system local memories 14A, 14B is managed by being divided into three separate storage extents of the self-system controller receive command storage areas 40A, 40B, the other-system controller receive command storage areas 41A, 41B, and the shared areas 42A, 42B. The self-system controller (CTL) receive command areas 40A, 40B and the other-system controller receive command storage areas 41A, 41B are respectively grouped and stored in the X core area and the Y core area.

Among the above, a control information storage area 40AX (self X core 40AXX, self Y core 40AXY) and a control information storage area 40BX (self X core 40BXX, self Y core 40BXY) are provided in the self-system controller receive command storage areas 40A, 40B, and commands such as write commands and read commands received by the self-system host communication control units 10A, 10B are stored in the control information storage areas 40AX, 40BX.

Further, a control information storage area 41AX (other X core 41AXX, other Y core 41AYX) and a control information storage area 41BX (other X core 41BXX, other Y core 41BYX), and an execution processing storage area 41AY (other X core 41AYX, other Y core 41AYY) and an execution processing storage area 41BY (other X core 41BYX, other Y core 41BYY) are provided in the other-system controller receive command storage areas 41A, 41B, and general commands and control information received by the host communication control units 10B, 10A of the other-system controllers 6B, 6A are stored in the control information storage areas 41AX, 41BX. Moreover, the execution processing storage areas 41AY, 41BY store the execution processing contents after the receive command is analyzed in the other-system controllers 6B, 6A upon the self-system controllers 6A, 6B newly handling the processing concerning the associated logical unit of the other-system controllers 6B, 6A. This is conducted when the microprocessor of the other-system controller 6B is blocked due to a failure or the like.

Further, the shared areas 32A, 32B store logical unit/processor association tables 43A, 43B, local memory information tables 44A, 44B, and cache memory information tables 45A, 45B. The logical unit/processor association tables 43A, 43B, the local memory information tables 44A, 44B and the cache memory information tables 45A, 45B will be described later.

Figure 5A:
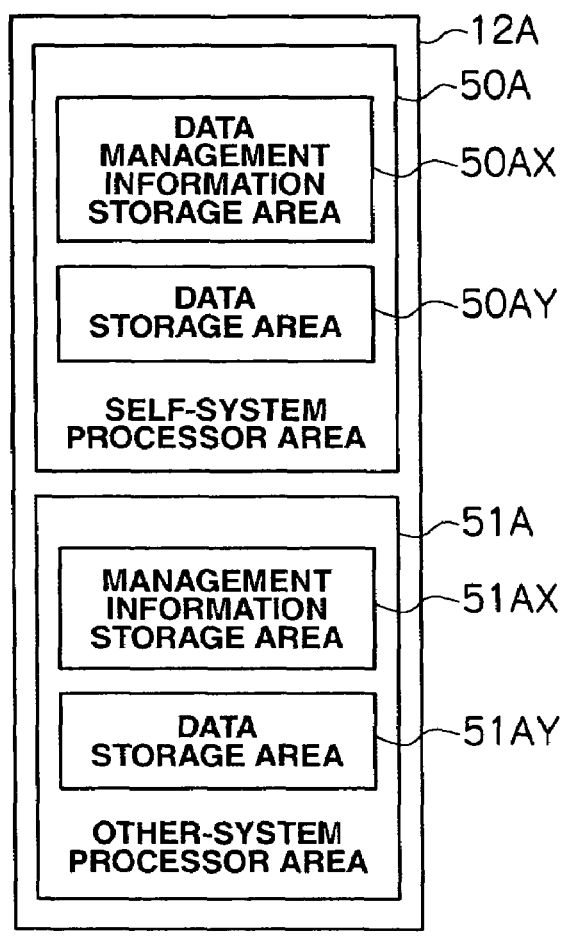
FIG. 5A is a conceptual diagram showing the memory configuration of a 0-system cache memory.
Figure 5B:
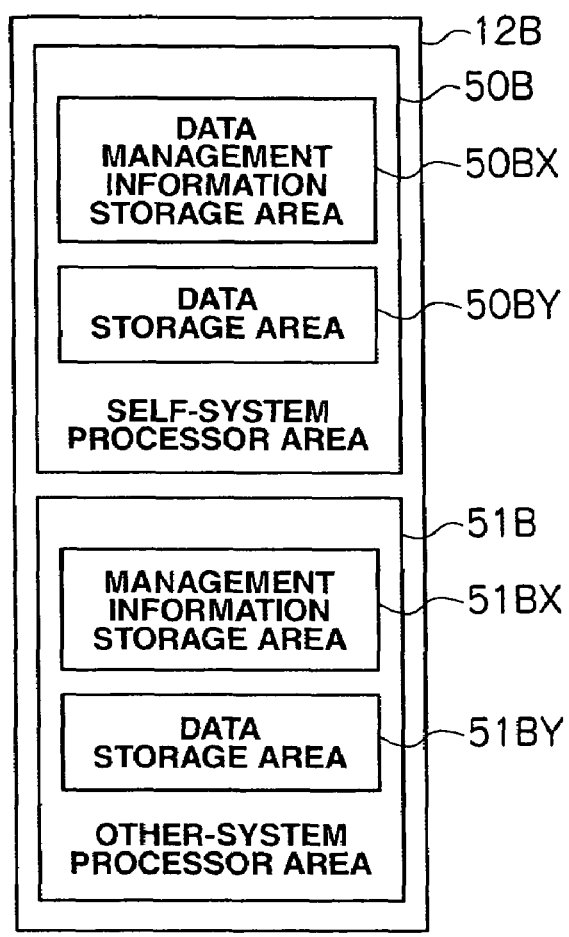
FIG. 5B is a conceptual diagram showing the memory configuration of a 1-system cache memory.

Meanwhile, FIG. 5A and FIG. 5B respectively show the memory configuration of the cache memories 12A, 12B in the respective controllers 6A, 6B of the 0-system and the 1-system. As shown in FIG. 5A and FIG. 5B, with the storage system 1, the storage extent of the 0-system and 1-system cache memories 12A, 12B is managed by being dividing into two separate storage extents of the self-system processor areas 50A, 50B and the other-system processor areas 51A, 51B. Here, the data management information storage areas 50AX, 50BX of the self-system processor areas 50A, 50B, and the data storage areas 50AY, 50BY are configured from a self X core area and a self Y core area. The management information storage areas 51AX, 51BX, and the data storage areas 51AY, 51BY of the other-system processor areas 51A, 51B are respectively configured from a self X core area and a self Y core area.

The self-system processor areas 50A, 50B are areas to be primarily used by the self-system microprocessor, and are configured from the data storage areas 50AY, 50BY for temporarily storing data upon transferring data between the host computers 2A, 2B and the storage apparatuses 4A to 4D, and the data management information storage areas 50AX, 50BX for storing management information of data to be stored in the data storage areas 50AY, 50BY.

Data stored in the data storage areas 50AY, 50BY and management information stored in the data management information storage areas 50AX, 50BX are thereafter duplicated (dual written) by the data transfer control units 11A, 11B in the corresponding data storage areas 51BY, 51AY or the data management information storage areas 51BX, 51AX in the other-system microprocessor storage areas 51B, 51A of the other-system cache memories 12B, 12A.

Further, the other-system microprocessor storage areas 51A, 51B are areas for duplicating (dual writing) information stored in the self-system controller storage areas 50B, 50A in the other-system cache memories 12B, 12A.

Incidentally, management information is information for managing data stored in the cache memories 12A, 12B, and is configured from information showing whether such data is read data or write data, and a data guarantee code for guaranteeing the data between the microprocessors 15A, 15B and the host communication protocol chips 21A, 21B.

Figure 7:
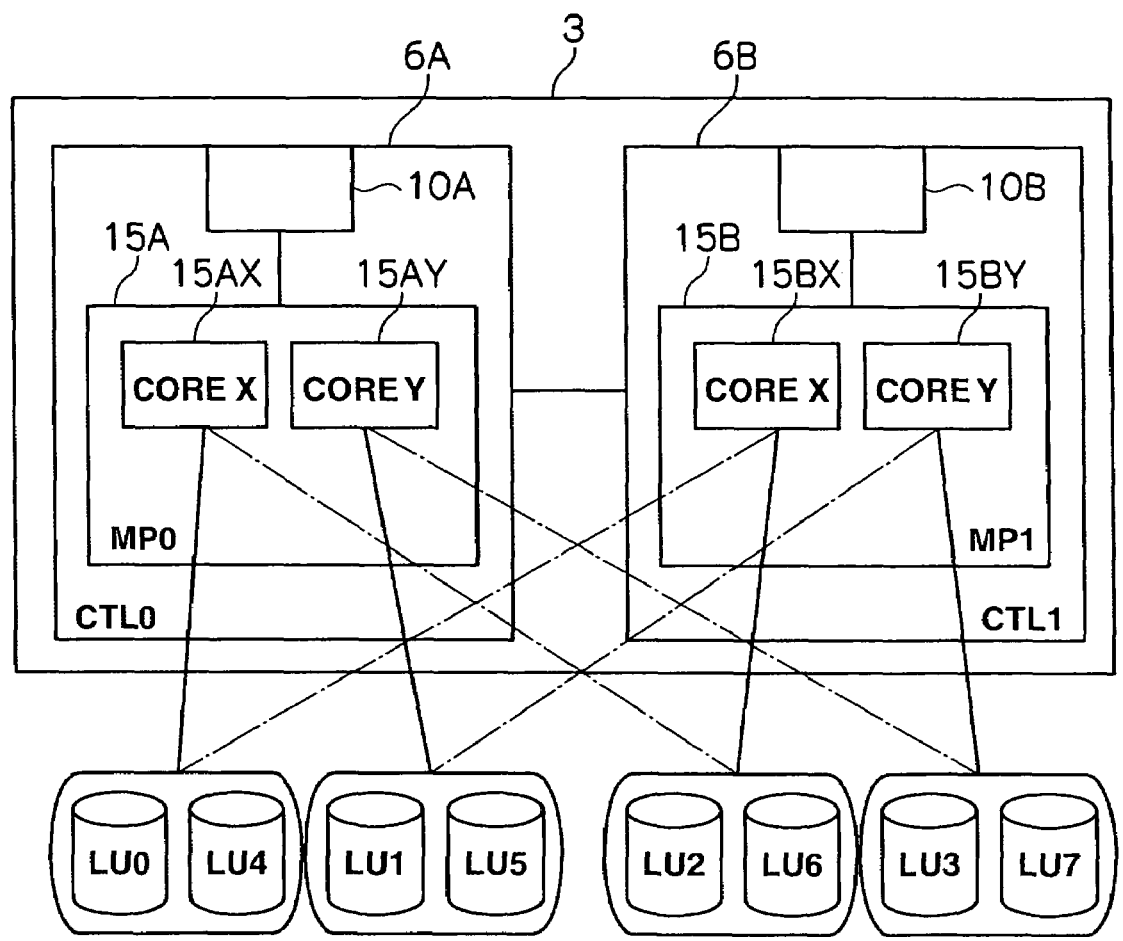
FIG. 7 is a block diagram showing the correspondence of the respective cores of a 0-system controller, the respective cores of a 1-system controller, and a plurality of logical units.

FIG. 6 to FIG. 8 respectively show the foregoing logical unit/processor association tables 43A, 43B, the local memory information tables 44A, 44B, and the cache memory information tables 45A, 45B. The logical unit/processor association tables 43A, 43B shown in FIG. 6 are tables for managing the correspondence of the respective logical units and the microprocessors 15A, 15B to handle the processing concerning the logical units (these are hereinafter referred to as "associated cores" as appropriate), and, as shown in FIG. 6, are configured from a "LUN (Logical unit number)" field 43C, an "associated controller number" field 43D, an "associated core number" field 43E, a substitute core number field 43F, and a "processing flag" field 43G.

The "LUN" field 43C stores a LUN of each logical unit defined in the storage apparatuses 4A to 4D, and the "associated controller number" field 43D stores an identifier of the controllers 6A, 6B to handle the processing concerning such logical unit.

The "associated core number" field 43E stores an identifier of the associated core of the corresponding logical unit. Incidentally, the "associated core number" field 43E is provided for managing which one is the associated core when a plurality of microprocessors 15A, 15B exist in the associated controller. Although the foregoing example explained a case where a plurality of cores exists in a single microprocessor in one controller, when one controller has a plurality of processors and each processor comprises a plurality of cores, the logical unit/processor association tables 43A, 43B are created by respectively differentiating the plurality of cores of the plurality of controllers. Further, the number of cores in the microprocessor is not limited to two. Incidentally, the characteristic table 204 shown in FIG. 2 is a simplified depiction of the association table.

Further, the "substitute core number" field 43F also stores a core number to become a substitute when a failure occurs in the associated core. This substitute core is not set to a core in the same controller, and is set to a core of a different controller. FIG. 7 is a characteristic chart showing the correspondence of each LU and the associated core and substitute core. In FIG. 7, the straight lines show the associated core handling the write and read access to and from the logical volumes, and the dashed lines show the substitute core to become a substitute for the associated core. The reason the associated core and the substitute core are set in different controllers is as follows. When a substitute core is set in a processor of the same controller as the associated core, when a failure occurs in the overall controller, neither the associated core nor the substitute core belonging to that controller will be able to process the IO access from the host computer.

As a result of the storage system 1 communicating commands between the controller 6A and the controller 6B, when comparing cases where the controller 6B processes commands received by the controller 6A, the controller 6A processing commands received by the controller 6B, and the controller that received the command personally processing such command, there will hardly be any difference in the processing time required for such command processing. Thus, even when a substitute core is set between the controllers and such substitute core receives commands from the other controller and processes host IO when a failure occurs in the associated core, the processing time will not be lengthened substantially.

Returning to FIG. 6, the "processing flag" field 43G stores a processing flag for managing the data consistency of the corresponding logical unit. For instance, "host 0-0" shows that processing concerning a zeroth command targeting the corresponding logical unit provided from the host computers 2A, 2B having an identifier of "0" is being executed, and "host 1-0" shows that processing concerning the zeroth command targeting the corresponding logical unit provided from the host computers 2A, 2B having an identifier of "1" is being executed.

Thus, for instance, in the example shown in FIG. 6, the associated controller of the respective logical units having a LUN of "0", "2" and "4" is the 0-system controller 6A; the associated core is the core having an identifier of "X0" when the LUN is "0", "4" and is the core having an identifier of "Y0" when the LUN is "2"; and the logical unit having a LUN of "0" is currently being subject to processing concerning the zeroth command targeting such logical unit provided from the host computer 2A having an identifier of "0".

Further, in the example shown in FIG. 6, the associated controller of the respective logical units having a LUN of "1", "3" and "5" is the 1-system controller 6B, the associated core is the core having an identifier of "X1" when the LUN is "1", "5" and is the core having an identifier of "Y1" when the LUN is "3", and the logical unit having a LUN of "1" is currently being subject to processing concerning a first command targeting the logical unit provided from the host computers 2A, 2B having an identifier of "0". Incidentally, the core X0 and the core Y0 are the respective cores of the 0-system controller processor 15A, and the core X1 and the core Y1 are the respective cores of the 1-system controller processor B.

With the storage system 1, for instance, when a new command other than the "0"th command is given from the host computers 2A, 2B to the logical unit having a LUN of "0" in a state shown in FIG. 6, the processing concerning the new command is not executed until the processing concerning the "0"th command is completed, and the processing concerning the new command is executed after the processing concerning the "0"th command is completed. As a result of this kind of control, it is possible to maintain the consistency of the data I/O processing to the respective logical units when the plurality of host computers 2A, 2B share a logical unit.

Meanwhile, the local memory information tables 44A, 44B are tables for managing the address information and the like required to respectively access the local memory 14A in the 0-system controller 6A and the local memory 14B in the 1-system controller 6B, and are configured from a "memory identifier" field 44C1, a "core identifier" field 44C2, a "memory address area" field 44D, a "segment block identifier" field 44E, a "top segment address" field 44F and an "open flag" field 44G.

Among the above, the "memory identifier" field 44C1 stores a unique identifier given to the corresponding local memories 14A, 14B. Further, the "core identifier" field 44C2 stores a unique identifier given to the core. The meaning of an identifier of a core is the same as the explanation given with reference to FIG. 6.

The "memory address area" field 44D stores an address area given to each extent in the storage extent provided by the corresponding local memories 14A, 14B. In the foregoing case, the addresses are allocated so that they do not overlap through the storage extents provided by the respective local memories 14A, 14B in the 0-system and 1-system controllers 6A, 6B, and the storage extents provided by the respective cache memories 12A, 12B in the 0-system and 1-system controllers 6A, 6B.

Further, the "segment block identifier" field 44E stores an identifier of each divided area (this is hereinafter referred to as a "segment") formed by dividing the storage extent provided by the corresponding local memories 14A, 14B in prescribed units. These identifiers are allocated so that they do not overlap through each segment defined in the storage extent provided by the respective local memories 14A, 14B in the 0-system and 1-system controllers 6A, 6B, and each segment defined in the respective cache memories 12A, 12B in the 0-system and 1-system controllers 6A, 6B.

Further, the "top segment address" field 44F stores a top address of the corresponding segment, and the "open flag" field 44G stores a flag (this is hereinafter referred to as an "open flag") representing whether data can be written in this segment. Specifically, the "open flag" field 44G stores an open flag ("1") when data can be written in the corresponding segment, and stores "0" when data cannot be written in the segment (when data is already stored therein).

As shown in FIG. 8, the storage extent provided by the local memory 14A in the 0-system controller 6A given an identifier of "LM0" has address areas "A000 to A999" regarding the core X0, and this storage extent is divided into segments in which the respective top addresses are "A100", "A200", . . . . Further, the example illustrated in FIG. 8 shows that, at present, data cannot be written in the segments having an identifier of "a" and "c", and that, at present, data can be written in the segment having an identifier of "b".

Similarly, the storage extent provided by the local memory 14A in the 0-system controller 6A given an identifier of "LM0" has address areas "B000 to B999" concerning core Y0, and this storage extent is divided into segments in which the respective top addresses are "B100", "B200", . . . Further, the example illustrated in FIG. 8 shows that, at present, data can be written in the segments having an identifier of "d" and "e", and that, at present, data cannot be written in the segment having an identifier of "f".

Like this, with the storage system 1, by referring to the local memory information tables 44A, 44B, not only can the 0-system and 1-system controllers 6A, 6B acquire information of the self-system local memories 14A, 14B, they will also be able to acquire information of the other-system local memories 14B, 14A. Thus, not only can the microprocessors 15A, 15B and the host communication protocol chips 21A, 21B in the 0-system and 1-system controllers 6A, 6B access the self-system, they will also be able to access the other-system local memories 14B, 14A. In addition, since a microprocessor has a plurality of cores, as shown in FIG. 2 described above, the port and logical unit to be handled by the respective cores have been set forth so that each core is able to process commands from the host computer.

Meanwhile, the cache memory information tables 45A, 45B shown in FIG. 9 are tables storing information for respectively accessing the local memory 14A in the 0-system controller 6A and the local memory 14B in the 1-system controller 6B, and, as shown in FIG. 7, are configured from a "memory identifier" field 45C, a "memory address area" field 45D, a "segment block identifier" field 45E, a "top segment address" field 45F, a "time stamp" field 45G, and a "dirty flag" field 45H.

The "memory identifier" field 45C stores a unique identifier given to the corresponding cache memories 12A, 12B. Further, the "memory address area" field 45D stores the address area given to each extent in the storage extent provided by the corresponding cache memories 12A, 12B.

The "segment block identifier" field 45E stores an identifier of each segment in the corresponding cache memories 12A, 12B, and the "top segment address" field 45F stores a top address of the corresponding segment among the foregoing segments.

The "time stamp" field 45G stores a time stamp representing the time that the data was stored in the corresponding segment, and the "dirty flag" field 45H stores a flag (this is hereinafter referred to as a "dirty flag") representing whether the data stored in the corresponding segment in the cache memories 12A, 12B has been stored in the storage apparatuses 4A to 4D. Specifically, the "dirty flag" field 45H stores a dirty flag ("1") when such data has already been stored in the storage apparatuses 4A to 4D, and stores "0" when such data has not yet been stored in the storage apparatuses 4A to 4D.

Thus, in the example shown in FIG. 9, the storage extent provided by the cache memory 12A in the 0-system controller 6A given an identifier of "CM0" has address areas "CA000" to "CA999", and this storage extent is divided into segments in which the respective top addresses are "CA100", "CA200", . . . Further, the example illustrated in FIG. 9 shows that, regarding the segment having an identifier of "A", data stored in such segment has not yet been stored in the storage apparatuses 4A to 4D, and that, regarding the segments having an identifier of "B" and "C", data stored in these segments has already been stored in the storage apparatuses 4A to 4D.

Similarly, in the example shown in FIG. 9, the storage extent provided by the cache memory 12B in the 1-system controller 6B given an identifier of "CM1" has address areas "CB000" to "CB999", and this storage extent is divided into segments in which the respective top addresses are "CB100", "CB200", . . . Further, the example illustrated in FIG. 9 shows that, regarding the segments having an identifier of "D" and "F", data stored in such segments has not yet been stored in the storage apparatuses 4A to 4D, and that, regarding the segment having an identifier of "E", data stored in this segment has already been stored in the storage apparatuses 4A to 4D.

Like this, with the storage system 1, by referring to the cache memory information tables 45A, 45B, not only can the 0-system and 1-system controllers 6A, 6B acquire information of the self-system cache memory 12A, 12B, they will also be able to acquire information of the other-system cache memory 12B, 12A. Thus, not only can the microprocessors 15A, 15B and the host communication protocol chips 21A, 21B in the 0-system and 1-system controllers 6A, 6B access the self-system, they will also be able to access the other-system cache memories 12B, 12A. Incidentally, in reality, similar to the explanation given with reference to FIG. 8, the respective fields of FIG. 9 are classified and set for each core.

Incidentally, when one of the logical unit/processor association tables 43A, 43B, local memory information tables 44A, 44B and cache memory information tables 45A, 45B stored in the shared areas 42A, 42B (refer to FIG. 3A and FIG. 3B) of the local memories 14A, 14B is changed, such change is also reflected on the other, and processing with consistency between the 0-system and 1-system controllers 6A, 6B is thereby executed.

Further, the configuration may be such that, among the information stored in the local memory information tables 44A, 44B, a first local memory information table (not shown) storing only information concerning the 0-system local memory 14A is stored in the 0-system local memory 14A, and a second local memory information table (not shown) storing only information concerning the 1-system local memory 14B is stored in the 1-system local memory 14B, and, instead, a storage destination address of the first local memory information table is stored in the 1-system local memory 14B, and a storage destination address of the second local memory information table is stored in the 0-system local memory 14A. As a result of adopting the foregoing configuration, it is no longer necessary to redundantly store an open flag in the other-system local memories 14B, 14A in addition to the self-system local memories 14A, 14B each time processing is executed, and this will yield an effect of improving the processing speed and alleviating the processing load.

Similarly, the cache memory information tables 45A, 45B may also be configured such that a first cache memory information table (not shown) storing only information concerning the 0-system cache memory 12A is stored in the 0-system local memory 14A, and a second cache memory information table (not shown) storing only information concerning the 1-system cache memory 12B is stored in the 1-system local memory 14B, and storing only the address information of the respective memories in the other local memory 14B or 14A.

Further, it is also possible to configure the storage destination by giving preference to the area in which the information/data has been updated at the earliest time among the areas capable of storing information/data using a time stamp stored in the "time stamp" field 45G of the cache memory information table 45A, 45B. Thereby, the newly updated data will remain in the cache memories 12A, 12B, and the cache hit ratio will improve.

The specific processing contents of the write command processing in the storage system 1 are now explained with reference to FIG. 10 to FIG. 12. Here, a case is explained where the 0-system controller 6A receives a write command from the host computer 2A. Incidentally, in the explanation of FIG. 10 to FIG. 12, the operation of the processor 15A and the processor 15B is the same as regarding the core X and the core Y, and are referred to as "processors" for the sake of convenience in the explanation. Incidentally, after the explanation of FIG. 10 to FIG. 12, the operation of the respective cores will be focused on and explained again with reference to FIG. 2.

When the host communication protocol chip 21A of the 0-system controller 6A receives a write command from the host computer 2A (SP1), it refers to the logical unit/processor association table 43A (FIG. 6) and the local memory information table 44A (FIG. 8) stored in the self-system local memory 14A and determines whether the associated core of the target logical unit is the microprocessor 15A of the self-system (0-system) (SP2).

When the host communication protocol chip 21A obtains a negative result in this determination, it transfers the write command received at step SP1 to the 1-system local memory 14B (SP3). Thereby, this write command will be stored in the control information storage area 41AX (FIG. 4) of the other-system controller receive command storage area 41A (FIG. 4) described above with reference to FIG. 3 in the local memory 14B. Incidentally, the storage area storing the commands is configured from a queue structure as described above.

Thereupon, the 0-system communication host protocol chip 21A designates the segment with a raised open flag in the control information storage area 41AX of the 1-system local memory 14B as the write destination and transfers the write command to the 1-system local memory 14B based on the local memory information table 44A stored in the self-system local memory 14A. Thereby, the write command can be transferred between the 0-system and 1-system controllers 6A, 6B without destroying the information in the 1-system local memory 14B.

Meanwhile, the 1-system microprocessor 15B is monitoring the self-system local memory 14B through periodical polling, and, upon recognizing that the write command has been stored in the local memory 14B (SP4), it analyzes this write command and creates a DMA (Direct Memory Access) list 50 (refer to FIG. 10) for storing write data in the self-system cache memory 12B, and stores this in the control information storage area 41AX (FIG. 4) of the other-system controller receive command storage area 41A (FIG. 4) in the self-system local memory 14B (SP5).

Upon creating this DMA list 50, the cache memory information table 45B (FIG. 9) stored in the local memory 14B is referred to, and a top address of the segment in which the dirty flag is 0 and the time stamp is oldest is designated as the data storage destination address. Here, the 1-system microprocessor 15B stores a dirty flag (stores "1") in the "dirty flag" field 45H (FIG. 9) corresponding to the segment in the cache memory information table 45B stored in the self-system local memory 14B.

Subsequently, the 1-system microprocessor 15B boots the host communication protocol chip 21A in the 0-system controller 6A using the PCI-Express message signal interrupt (this is hereinafter referred to as "MSI (Message Signal Interrupt)") defined with the PCI-Express Standard, and commands the host communication protocol chip 21A to perform data transfer according to the DMA list 50 created at step SP5 (SP6).

The 0-system host communication protocol chip 21A that received the command reads the DMA list 50 from the 1-system local memory 14B (SP7). Further, the host communication protocol chip 21A receives the write data sent from the host computer 2A and stores it in the self-system cache memory 12A based on the DMA list 50, and executes processing for notifying the DMA address to the self-system data transfer control unit 11A (SP8).

When the 0-system data transfer control unit 11A is notified of the DMA address from the self-system host communication protocol chip 21A as described above, it reads the write data stored in the self-system cache memory 12A and transfers such write data to the 1-system controller 6B. As a result, this write data is also stored in the cache memory 12B of the 1-system controller 6B, and the write data is duplicated (SP9).

Further, when the duplication of the write data is completed, the 0-system host communication protocol chip 21A sends a notice to the 1-system microprocessor 15B that the data transfer (duplication) is complete (this is hereinafter referred to as a "data transfer completion notice") using an MSI (Message Signal Interrupt), which is a PCI Standard interrupt notice function (SP10). As a result of using MSI as the method of sending a notice from the host communication protocol chip 21A to the microprocessor 15B, the communication processing between the self-system and other-system controllers 6A, 6B will no longer be required, and the deterioration in the system performance can be prevented.

When the 1-system microprocessor 15B receives the data transfer completion notice, it issues a command to the 0-system host communication protocol chip 21A for sending a notice to the effect that the write command processing is complete to the corresponding host computer 2A. The 0-system host communication protocol chip 21A that received this command sends a report to the effect that the writing of write data is complete to the host computer 2A that sent the write command (SP11).

Subsequently, the 1-system microprocessor 15B migrates (destages) the write data stored in the self-system cache memory 12B to the logical volume LU1 designated in the corresponding storage apparatuses 4A to 4D, and sets the dirty flag stored in the corresponding "dirty flag" field 45H of the cache memory information table 45B stored in the self-system local memory 14B to "0" (SP12).

Meanwhile, when the 0-system host communication protocol chip 21A obtains a positive result in the determination at step SP2, it stores the write command in the self-system controller receive command storage area 40A (FIG. 3) of the self-system local memory 14A (SP13). As a result, the write command stored in the local memory 14A will eventually be recognized by the 0-system microprocessor 15A through periodical polling (SP14).

When the microprocessor 15A recognizes that the write command has been given, it analyzes the write command, creates a DMA list 50 (FIG. 10) storing an address of the cache memory 12A to which the write data is to be written and the data length of the write data for storing the corresponding write data in the self-system cache memory 12A, and stores this in the self-system controller receive command storage area 40A (FIG. 4) of the self-system local memory 14A (SP15).

Upon creating this DMA list 50, the cache memory information table 45A stored in the local memory 14A is referred to, and a top address of the segment in which the dirty flag is 0 and the time stamp is oldest is designated as the data storage destination address. Here, the 0-system microprocessor 15A stores a dirty flag (stores "1") in the "dirty flag" field 45H (FIG. 9) corresponding to the segment in the cache memory information table 45A stored in the self-system local memory 14A.

Subsequently, the 0-system microprocessor 15A boots the self-system host communication protocol chip 21A, and commands the host communication protocol chip 21A to perform data transfer according to the DMA list 50 created at step SP15 (SP16).

Thereby, the 0-system host communication protocol chip 21A reads the DMA list 50 from the self-system local memory 14A (SP17). Further, the host communication protocol chip 21A receives the write data sent from the host computer 2A and stores it in the self-system cache memory 12A based on the DMA list 50, and executes processing for notifying the DMA address to the self-system data transfer control unit 11A (SP18).

When the 0-system data transfer control unit 11A is notified of the DMA address from the self-system host communication protocol chip 21A as described above, it reads the write data stored in the self-system cache memory 12A and transfers such write data to the 1-system controller 6B. As a result, this write data is also stored in the cache memory 12B of the 1-system controller 6B, and the write data is duplicated (SP19).

The 0-system microprocessor 15A issues a command to the self-system host communication protocol chip 21A for sending a notice to the effect that the write command processing is complete to the corresponding host computer 2A. The 0-system host communication protocol chip 21A that received this command sends a report to the effect that the writing of write data is complete to the corresponding host computer 2A (SP20).

Subsequently, the 0-system microprocessor 15A migrates (destages) the write data stored in the self-system cache memory 12A to the logical volume LU1 designated in the corresponding storage apparatuses 4A to 4D, and sets the dirty flag stored in the corresponding "dirty flag" field 45H of the cache memory information table 45A stored in the self-system local memory 14A to "0" (SP21).

Incidentally, during this kind of write command processing, when the 0-system and 1-system microprocessors 15A, 15B are to store information in the self-system local memory 14A or the other-system local memory 14B, they set the open flag stored in the corresponding "open flag" field 44G of the corresponding local memory information tables 14A, 14B to "0", and thereafter set the open flag to "1" when such information is not longer required in the subsequent processing.

Although a case was explained above where the 0-system controller 6A received a write command from the host computer 2A, the same applies when the 1-system controller 6B receives a write command from the host computer 2B.

The operation of the respective cores of the processor is now explained with reference to FIG. 2. Let it be assumed that a write command 206 for writing data in a logical unit (LUN1) is issued from the host computer 2A to the port A of the host communication control unit 10A. The communication protocol chip 21A stores the write command in the receive queue a located in the X core area of the local memory 14A (S200). The X core 15AX receives the commands in the queue a in order (S202), and analyzes the received commands.

The X core 15AX distributes the commands to an appropriate command queue 202 from the S_ID (host identifier) of the command and the logical unit number LUN. The X core 15AX determines, based on the characteristic table 204, that it is a command to the logical unit LUN1 and that this command to the logical unit LUN1 is to be handled by the Y core, and stores this command in the command queue C. The Y core 15AY calls the commands from the command queue C in order (S206), and executes this write processing to the logical unit LUN1 based on the command in a round robin.

As a result of adopting this kind of multi core system, it is possible to improve the command processing performance in port units, and optimize the load balance of command processing. Incidentally, when a command directed to the 1-system controller 6B is input to the 0-system controller 6A from the host computer 2A, the core X0 or the core Y0 of the 0-system processor 15A transfers such command to the 1-system controller 6B and stores the command in the foregoing command queue allocated to the associated core (core X1 or core Y1) of the processor 15B based on the S_ID (host identifier), the logical unit number LUN, and the control information table shown in FIG. 6.

Figure 13:
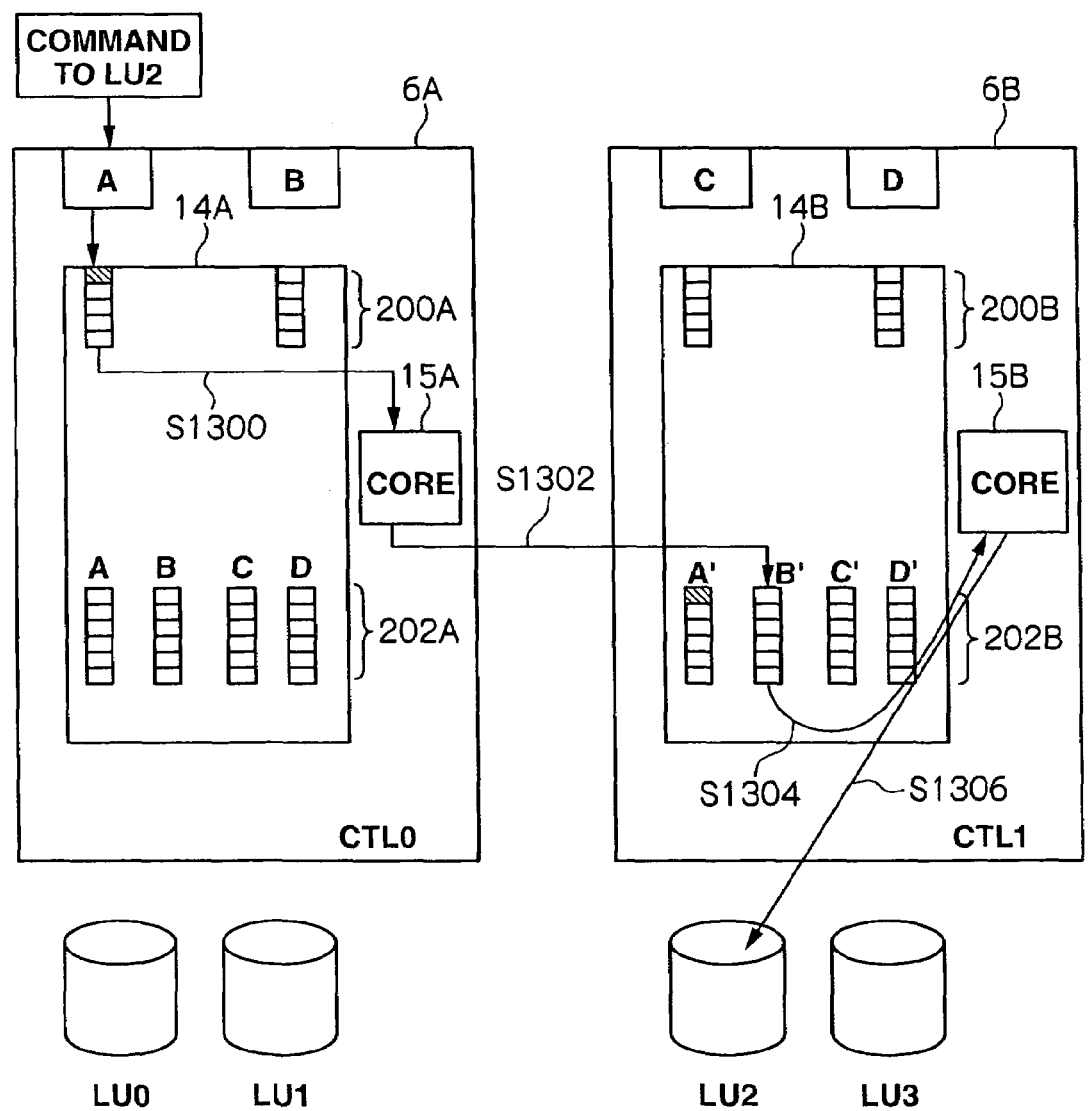
FIG. 13 is a block diagram showing the transfer operation of commands via a queue between the 0-system controller and the 1-system controller.

FIG. 13 shows the processing operation in a case where a write command directed to a logical unit having an identifier of LUN2 is issued to the port A of the 0-system storage subsystem 6A from the host computer. The core of the microprocessor 15A of the 0-system controller 6A receives the command from the receive queue (S1300), and stores it in the command queue B' of the local memory 14B of the 1-system controller 6B (S1302). The core of the microprocessor 15B of the 1-system controller 6B executes the command stored in the command queue B' (S1304), and executes the write processing to the logical unit LU2 (S1306).

Figure 14:
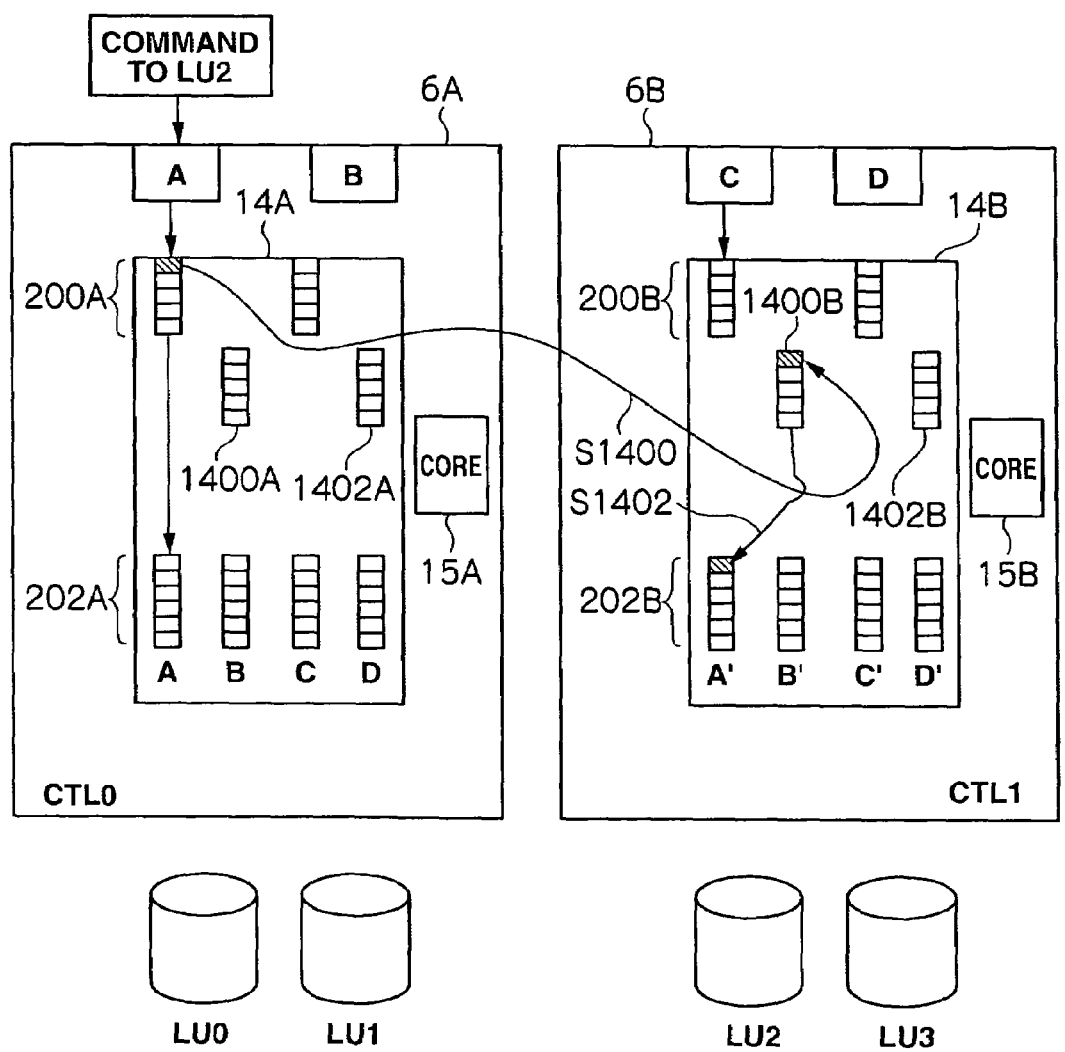
FIG. 14 is a block diagram showing another embodiment that is different from FIG. 13.

FIG. 14 is a modified example of FIG. 13. This modified example differs from the example shown in FIG. 13 in the following respects. As the host communication protocol chips 21A, 21B, a fibre channel protocol IC (Agilent HPFC-5700A Tachyon DX4+fibre channel protocol IC (product name)) compatible with a data transfer rate of 4 GB/s or the like is used, and the host communication protocol chip stores the commands stored in the receive queue 200A in the local memory 14B of the 1-system (other-system) without going through the microprocessor core 15A.

The local memory 14A of the 0-system controller 6A and the local memory 14B of the 1-system controller 6B are provided with dummy queue 1400A, 1402A, 1400B, 1402B for storing commands that have been transferred from the other-system controller, or which should be transferred to the other-system controller. A "dummy" queue is named like this because it is not a queue that stores commands to the self-system controller. Further, the reason two dummy queues are provided to each controller A and B is because one is an X core and the other is a Y core. When the processor is configured from a single core, only one dummy queue is required for each controller. The cores 15A, 15B periodically perform polling to these dummy queues and store the queues in the command queue. In FIG. 14, the host communication protocol chip 21A of the 0-system controller stores the commands, which were stored in the receive queue 200A of the local memory 14A, in the dummy queue 1400B of the local memory 14B of the 1-system controller (S1400). When the core 15B periodically checks the dummy queue and discovers a command to the logical unit LU2, it stores this in the command queue A' set to the logical unit LU2 (1402), and processes the commands stored in the command queue A' in order.

The read command processing in the storage system 1 is now explained with reference to FIG. 15 to FIG. 17. Here, a case is explained where the 0-system controller 6A receives a read command from the host computer 2A. Incidentally, in the explanation of FIG. 15 to FIG. 17, the operation of the processor 15A and the processor 15B is the same as regarding the core X and the core Y, and are referred to as "processors" for the sake of convenience in the explanation.

When the host communication protocol chip 21A of the 0-system controller 6A receives a read command from the host computer 2A (SP30), it refers to the logical unit/processor association table 43A (FIG. 6) and the local memory information table 44A (FIG. 8) stored in the self-system local memory 14A and determines whether the associated core of the target logical unit is the microprocessor 15A of the self-system (0-system) (SP31).

When the host communication protocol chip 21A obtains a negative result in this determination, it transfers the read command received at step SP31 to the 1-system local memory 14B (SP32). Thereby, this read command will be stored in the control information storage area 41AX (FIG. 4) of the other-system controller receive command storage area 41A (FIG. 4) described above with reference to FIG. 3 in the local memory 14B.

Thereupon, the 0-system communication host protocol chip 21A designates the segment with a raised open flag in the control information storage area 41AX of the 1-system local memory 14B as the write destination and transfers the read command to the 1-system local memory 14B based on the local memory information table 44A stored in the self-system local memory 14A. Thereby, the read command can be transferred between the 0-system and 1-system controllers 6A, 6B without destroying the information in the 1-system local memory 14B.

Meanwhile, the 1-system microprocessor 15B is monitoring the self-system local memory 14B through periodical polling, and, upon recognizing that the read command has been stored in the local memory 14B (SP33), it analyzes this read command and determines whether the target read data exists in the 1-system cache memory 12B.

The microprocessor 15B proceeds to step SP38 when such read data exists in the cache memory 12B, and reads the read data from the corresponding storage apparatuses 4A to 4D and stores (stages) the read data in the cache memory 12B when such read data does not exist in the cache memory 12B (SP34).

The read data stored in the cache memory 12B is thereafter transferred to the 0-system controller 6A with the 1-system data transfer control unit 11B, and stored in the data storage area 50AY (FIG. 5) of the cache memory 12A in the controller 6A. The read data is thereby subject to dual writing (SP35).

Further, although the management information of this read data is also stored in the data management information storage area 50B (FIG. 5) of the self-system cache memory 12B with the 1-system microprocessor 15B (SP36), the management information is also transferred to the 0-system cache memory 12A, and stored in the data management information storage area 50A of the cache memory 12A. The management information of the read data is thereby also subject to dual writing (SP37).

Subsequently, the 1-system microprocessor 15B creates the DMA list 50 (FIG. 10) with the same method as the foregoing method described with reference to step SP5 of FIG. 9, and stores the created DMA list 50 in the self-system local memory 14B (SP38). The microprocessor 15B also boots the 0-system host communication protocol chip 21A and uses MSI to command the host communication protocol chip 21A to perform data transfer according to the DMA list 50 created at step SP38 (SP39).

The 0-system host communication protocol chip 21A that received the command reads the DMA list 50 from the 1-system local memory 14B (SP40), and notifies the required DMA address to the self-system data transfer control unit 11A based on the DMA list 50 (SP41). Further, the data transfer control unit 11A that received the notice transfers the management information of the read data to the self-system host communication protocol chip 21A according to the provided DMA address.

Meanwhile, the 0-system host communication protocol chip 21A that received the management information confirms the guarantee code and confirms that the data is read data based on such management information (SP42), and thereafter transfers the read data from the self-system cache memory 12A to the self-system host communication protocol chip 21A (SP43). Incidentally, the read data can also be sent from the 1-system cache memory 12B. The host communication protocol chip 21A thereafter sends this read data to the corresponding host computer 2A (SP44).

Meanwhile, when the 0-system host communication protocol chip 21A obtains a positive result in the determination at the foregoing step SP31, it stores the read command in the self-system controller receive command storage area 40A (FIG. 4) of the self-system local memory 14A (SP45). As a result, the read command stored in the local memory 14A will be eventually recognized by the 0-system microprocessor 15A through periodical polling (SP46).

Figure 16:
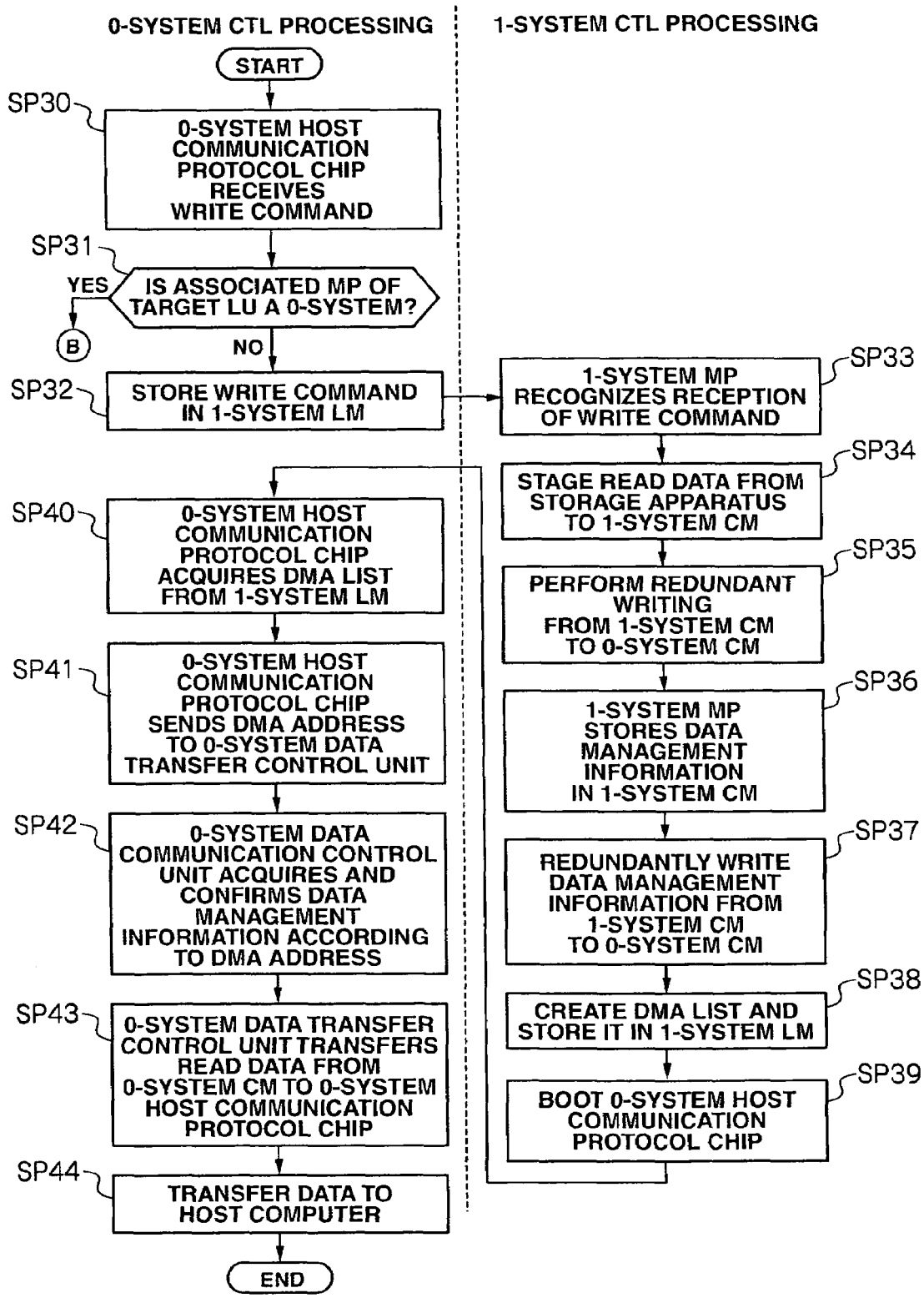
FIG. 16 is a flowchart explaining read command processing in a storage system according to an embodiment of the present invention.

Subsequently, the same processing as the processing described with reference to step SP34 to step SP44 of FIG. 16 is performed in the first controller 6A, and the read data designated by the read command is thereby read from the corresponding logical unit and sent to the host computer 2A (SP47 to SP57).

Incidentally, although a case was explained above where the 0-system controller 6A received a read command from the host computer 2A, the same applies when the 1-system controller 6B receives a read command from the host computer 2B.

The arbitration function loaded in the data transfer control units 11A, 11B and the bridges 13A, 13B is now explained. As described with reference to FIG. 1, with the storage system 1 according to the present embodiment, in the respective controllers 6A, 6B of the 0-system and 1-system, the host communication control units 10A, 10B, the cache memories 12A, 12B, the bridges 13A, 13B and the storage apparatus communication control units 16A, 16B are connected to the data transfer control units 11A, 11B via a prescribed bus, and a bus configuring the inter-controller connection path 5 is also connected thereto. Further, in the respective controllers 6A, 6B of the 0-system and 1-system, the local memories 14A, 14B, the microprocessors 15A, 15B and the data transfer control units 11A, 11B are connected to the bridges 13A, 13B via a prescribed bus. Thus, transfer requests of various commands are given to the data transfer control units 11A, 11B and the bridges 13A, 13B via the respective buses.

Thus, when transfer requests of a plurality of commands are given to the data transfer control units 11A, 11B and the bridges 13A, 13B, the processing in response to such transfer requests is performed in the order that the requests had arrived. Further, when a plurality of transfer requests arrive simultaneously to the data transfer control units 11A, 11B and the bridges 13A, 13B, transfer processing is performed in order from the command with the highest priority.

Here, with the storage system 1 according to the present embodiment, as commands that pass through the data transfer control units 11A, 11B and the bridges 13A, 13B, there are various commands to be given to the respective elements in the self-system controllers 6A, 6B from the microprocessors 15A, 15B, refresh commands to the local memories 14A, 14B, access commands to the cache memories 12A, 12B given from the other-system controllers 6B, 6A via the inter-controller connection path 5, and various commands concerning the DMA as described above, the priority of these commands is set forth in order in consideration of various circumstances.

Thus, with the storage system 1, if no measure is taken, as a result of high priority requests being sequentially given to the data transfer control units 11A, 11B and the bridges 13A, 13B, transfer of the transfer processing to commands concerning the DMA set with a low priority will be put on hold continuously.

Therefore, with the storage system 1 of this embodiment, the data transfer control units 11A, 11B and the bridges 13A, 13B are equipped with an arbitration function for evenly processing the requests from the bus, and it is thereby possible to prevent the transfer requests of various commands concerning the DMA set with a low priority as described from being put on hold continuously even when high priority requests are sequentially given to the data transfer control units 11A, 11B and the bridges 13A, 13B.

As described above, with the storage system 1 according to the present embodiment, when the 0-system controller 6A receives a write command or a read command targeting a logical unit with the 1-system controller 6B as the associated controller, the 0-system microprocessor 15A transfers and directly writes such write command or read command to and in the 1-system local memory 14B. Thus, communication between the 0-system and 1-system microprocessors 15A, 15B will no longer be required upon the transfer of the foregoing write command or read command between the 0-system and 1-system controllers 6A, 6B.

Accordingly, with this storage system 1, it is possible to effectively prevent an unnecessary load from arising in the controllers 6A, 6B that received the command based on the communication, and a delay in the processing time in response to the command. It is also possible to speed up the processing time in response to the command while reducing the load on the controller that received the command targeting a non-associated logical volume.

Further, with the storage system 1 of this embodiment, since the write command and read command are written in the self-system local memory 15B with a relatively fast access speed, for instance, it is possible to yield an effect of improving the processing speed in comparison to cases of exchanging the write command and read command via the cache memory 12B with a relatively slow access speed. Further, since sequential processing can be primarily performed by the 1-system microprocessor 15B with the intervention of the 0-system microprocessor 15A, for instance, even in cases where the processing load of the 0-system microprocessor 15A is high and the processing load of the 1-system microprocessor 15B is low, it is possible to avoid a situation where the response deteriorates due to the processing load of the 0-system microprocessor 15A becoming a bottleneck.

Moreover, with the storage system 1 of this embodiment, the 0-system controller 6A or the 1-system controller 6B that received the write command or read command from the host computers 2A, 2B will not have to newly create a job for requesting the processing to the other-system controllers 6B, 6A. Thus, whether the 0-system controller 6A or the 1-system controller 6B receives a command sent from the host computers 2A, 2B, the processing can be executed at roughly the same processing efficiency.

Thereby, with this storage system 1, it is no longer necessary to make the host computers 2A, 2B recognize the associated controller of the target logical unit, and, even when the 0-system controllers 6A, 6B receive write commands and read commands from numerous host computers 2A, 2B, it is possible to respond to such commands with a high processing speed. Thus, it is possible to improve the freedom of configuration and reduce maintenance work. For example, when the associated logical unit is to be dynamically switched according to the load status between the 0-system and 1-system microprocessors 15A, 15B, it is possible to prevent the deterioration in processing efficiency even when the process of setting the controllers 6A, 6B of the destination for realizing an appropriate load balance of the host computers 2A, 2B is not performed.

Figure 18:
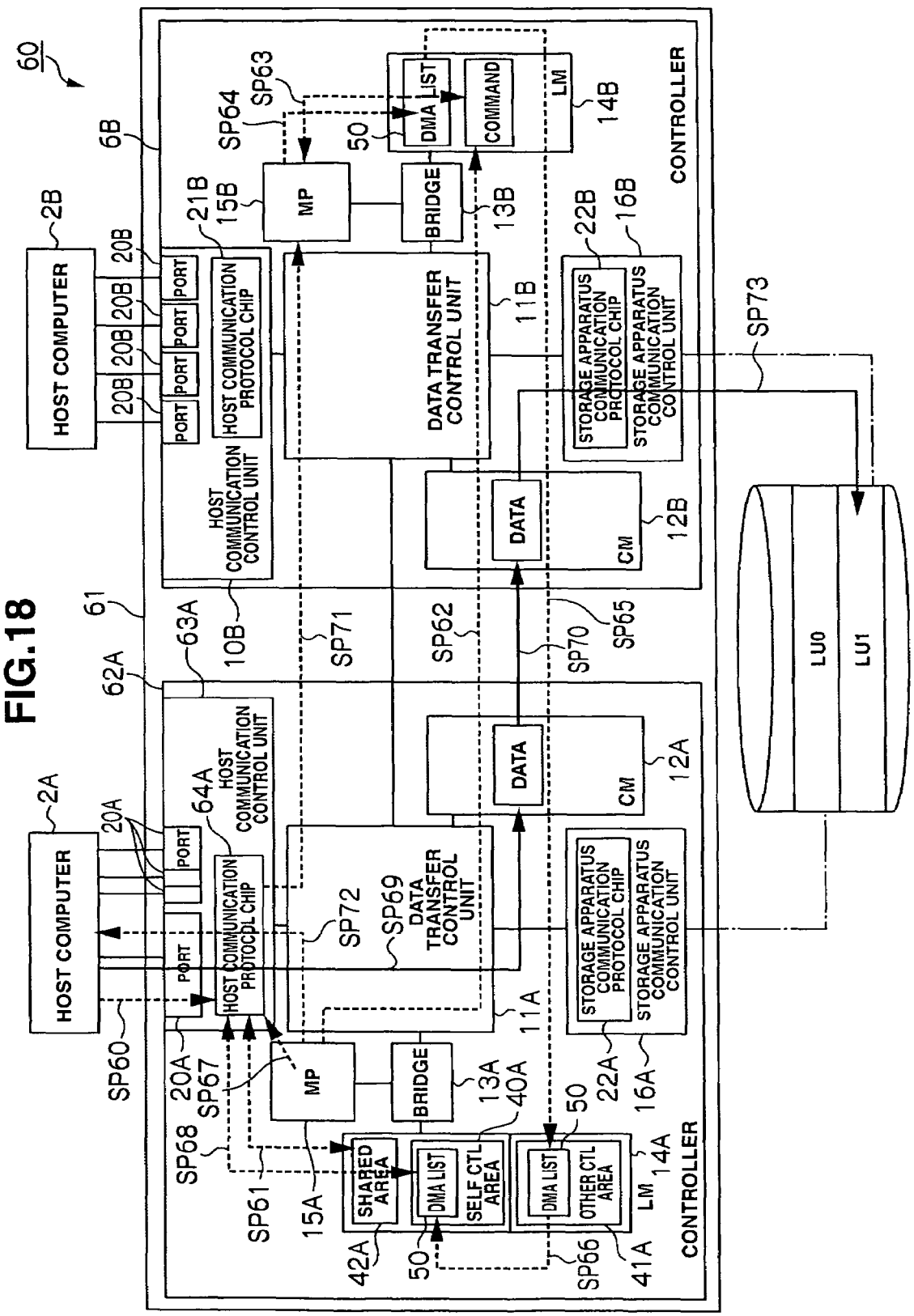
FIG. 18 is a block diagram explaining write command processing in a storage system according to another embodiment of the present invention.

FIG. 18 shows a storage system 60 according to another embodiment. This storage system 60 is configured the same as the storage system 1 (FIG. 1) according to the embodiment of FIG. 1 other than that the host communication protocol chip 63A provided in the host communication control unit 63A of the 0-system controller 62A configuring the storage controller 61 is not equipped with a multi CPU support function, and is only able to communicate data with a single microprocessor.

Figure 19:
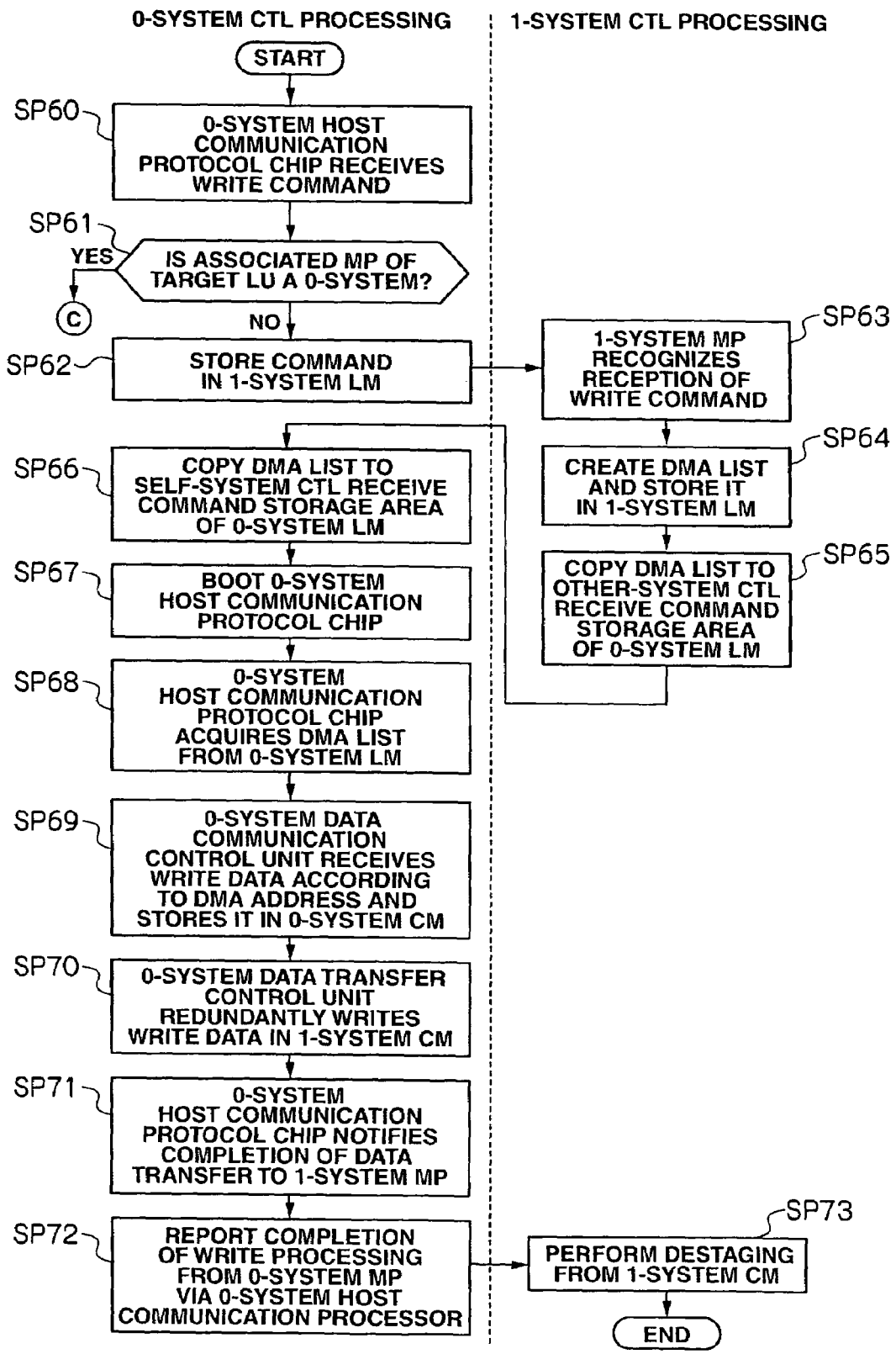
FIG. 19 is a flowchart explaining write command processing in a storage system according to another embodiment of the present invention.
Figure 20:
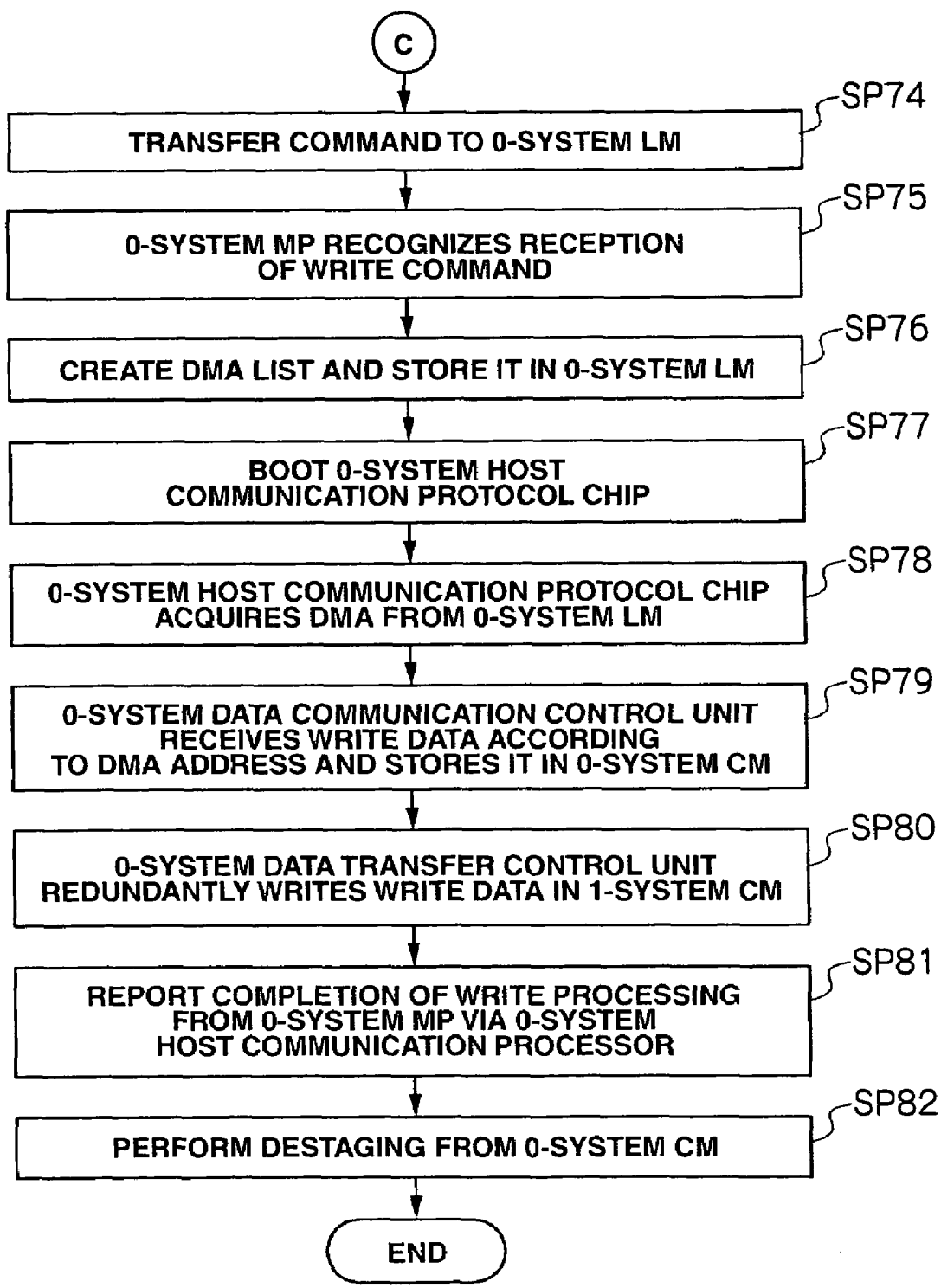
FIG. 20 is a flowchart explaining write command processing in a storage system according to another embodiment of the present invention.

FIG. 19 and FIG. 20 are flowcharts showing the flow of the write command processing in the storage system 60. Here, as with the embodiment of FIG. 1, a case is explained where the 0-system controller 62A receives a write command from the host computer 2A.

Figure 10:
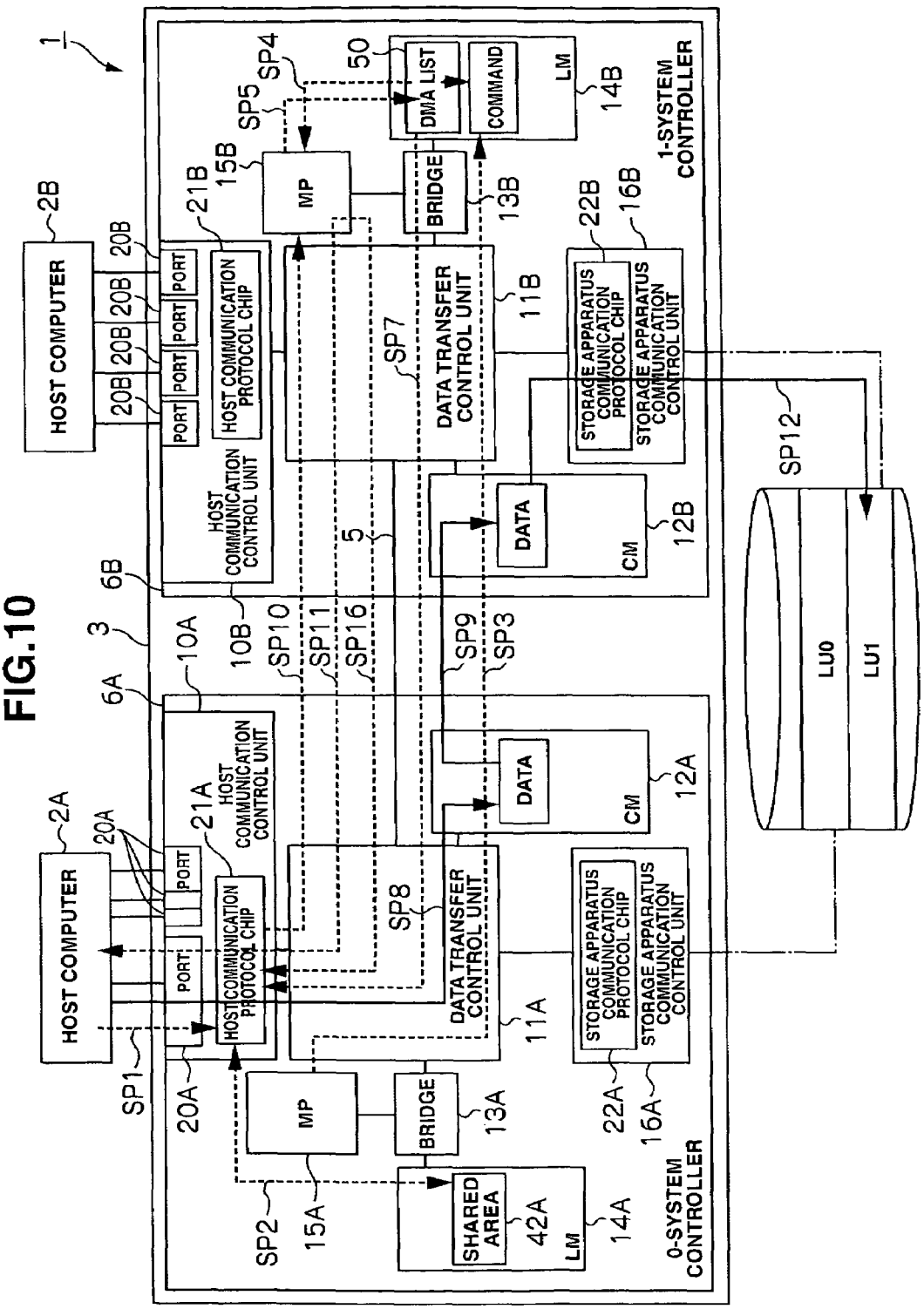
FIG. 10 is a block diagram explaining write command processing in a storage system according to an embodiment of the present invention.
Figure 11:
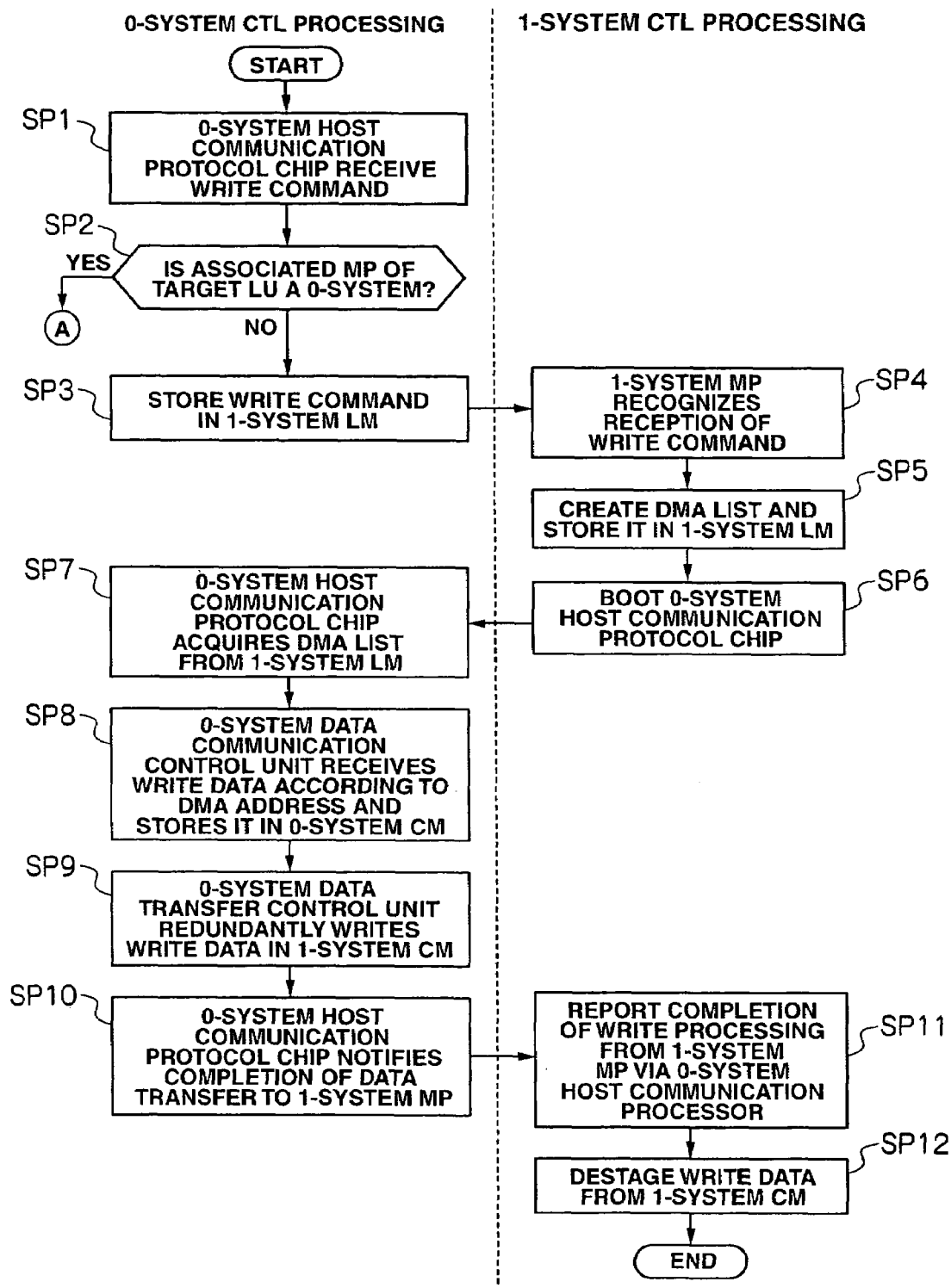
FIG. 11 is a flowchart explaining write command processing in a storage system according to an embodiment of the present invention.
Figure 12:
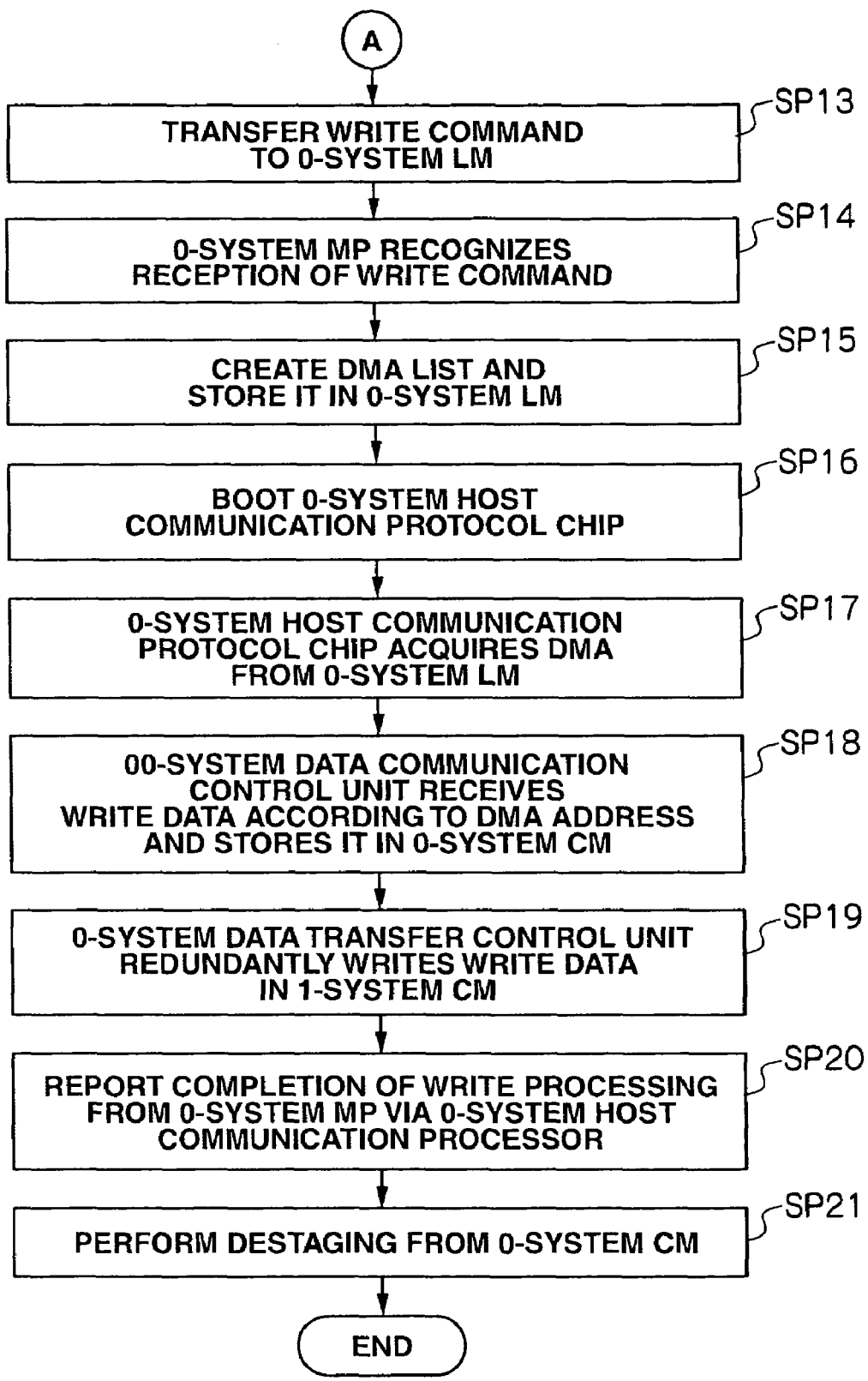
FIG. 12 is a flowchart explaining write command processing in a storage system according to an embodiment of the present invention.

In the foregoing case, with the storage system 60, as with step SP1 to step SP5 of FIG. 10 to FIG. 12, the write command given from the host computer 2A to the 0-system controller 62A is provided to the 1-system controller 6B, and the DMA list 50 is created in the 1-system controller 6B and stored in the 1-system local memory 14B based on this write command (SP60 to SP64).

The 1-system microprocessor 15B thereafter copies the DMA list 50 stored in the 1-system local memory 14B to the 0-system local memory 14A. Thereupon, the 1-system microprocessor 15B refers to the local memory information table 44B (FIG. 8) and designates the control information storage area 41AX (FIG. 4) in the other controller receive command storage area 41A of the 0-system local memory 14A as the copy destination of the DMA list 50 (SP65). This is because the 0-system microprocessor 15A boots the 0-system host communication protocol chip 64A so as to read the DMA list 50.

Meanwhile, the 0-system microprocessor 15A is monitoring the self-system local memory 14A through periodical polling, and, upon recognizing that the DMA list 50 has been stored in the local memory 14A, it copies this DMA list 50 to the control information storage area 40AX in the self controller storage receive area 40A of the local memory 14A (SP66).

Further, the microprocessor 15A thereafter boots the self-system host communication protocol chip 64A, and commands the host communication protocol chip 64A to perform the data transfer according to the DMA list 50 (SP67).

The host communication protocol chip 64A that received the command reads the DMA list 50 stored in the control information storage area 40AX of the self controller storage receive area 40A in the self-system local memory 14A, and notifies the DMA address to the self-system data transfer control unit 11A (SP68).

When the 0-system data transfer control unit 11A is notified of the DMA address from the self-system host communication protocol chip 21A as described above, it receives the write data from the host computer 2A according to this DMA address, and stores this in the self-system cache memory 12A (SP69).

Further, the 0-system data transfer control unit 11A transfers the write data stored in the self-system cache memory 12A to the 1-system controller 6B. As a result, this write data is also stored in the cache memory 12B of the 1-system controller 6B, and the write data is thereby duplicated (SP70). Moreover, when the duplication of the write data is complete, the 0-system host communication protocol chip 21A sends a data transfer completion notice to the 1-system microprocessor 15B through the data transfer control unit 11A, and uses the data transfer control unit 11A to create and send the foregoing MSI (SP71).

Subsequently, the 0-system microprocessor 15A issues a command to the self-system host communication protocol chip 64A for sending a notice to the effect that the write command processing is complete to the corresponding host computer 2A. The 0-system host communication protocol chip 64A that received this command sends a report to the effect that the writing of write data is complete to the host computer 2A that sent the write command (SP72).

Subsequently, the 1-system microprocessor 15B migrates (destages) the write data stored in the self-system cache memory 12B to the logical volume LU1 designated in the corresponding storage apparatuses 4A to 4D, and sets the dirty flag stored in the corresponding "dirty flag" field 45H of the cache memory information table 45B stored in the self-system local memory 14B to "0" (SP73).

Meanwhile, when the 0-system host communication protocol chip 64A obtains a positive result in the determination at step SP61, it migrates (destages) the write data from the host computer 2A to the logical volume LU1 designated in the corresponding storage apparatuses 4A to 4D according to the same routine as step SP13 to step SP21 of FIG. 12 (step SP74 to step SP82).

Incidentally, although a case was explained above where the 0-system controller 62A received a write command from the host computer 2A, the same applies when the 1-system controller 6B receives a write command from the host computer 2B.

Figure 21:
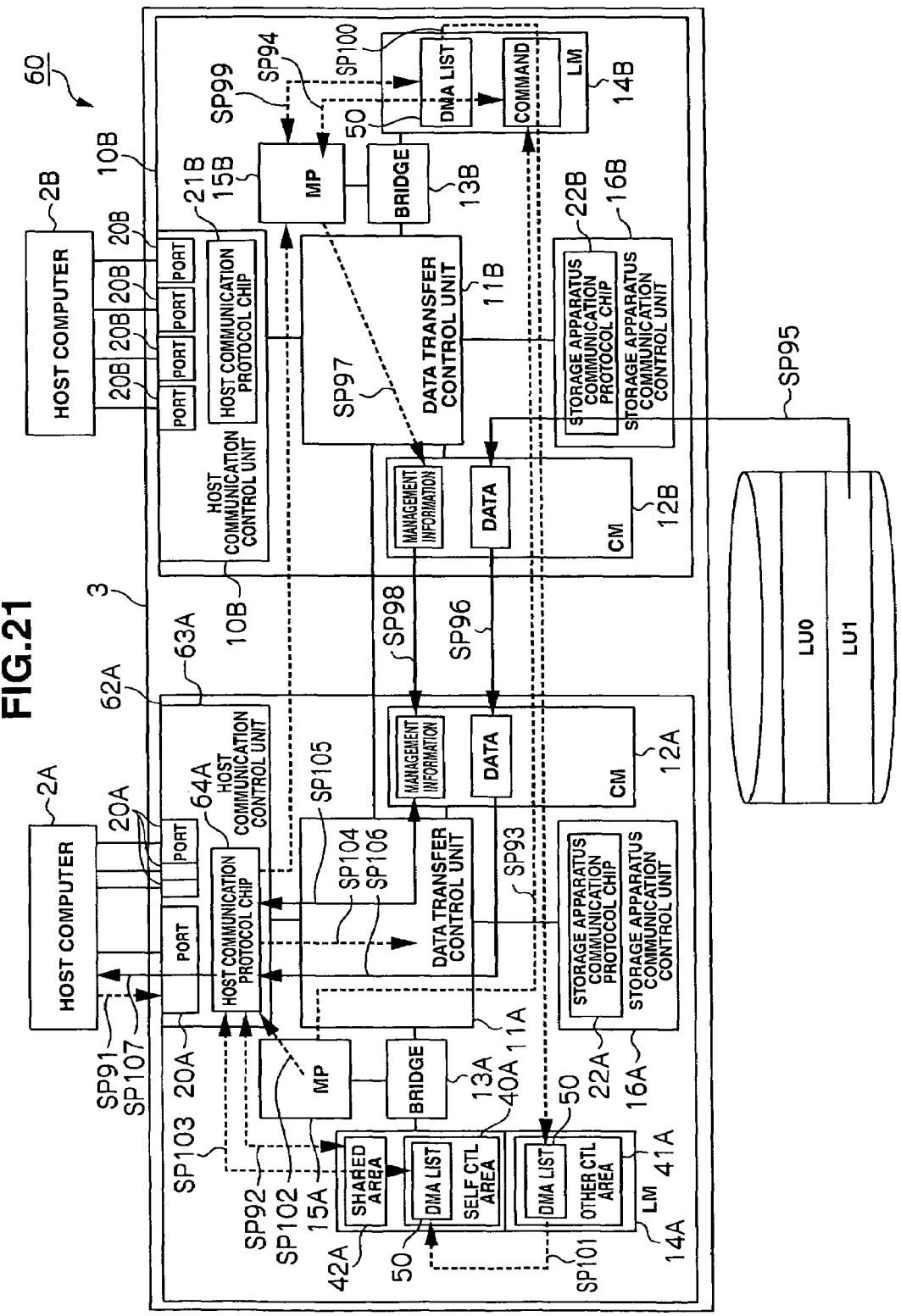
FIG. 21 is a block diagram explaining read command processing in a storage system according to another embodiment of the present invention.
Figure 22:
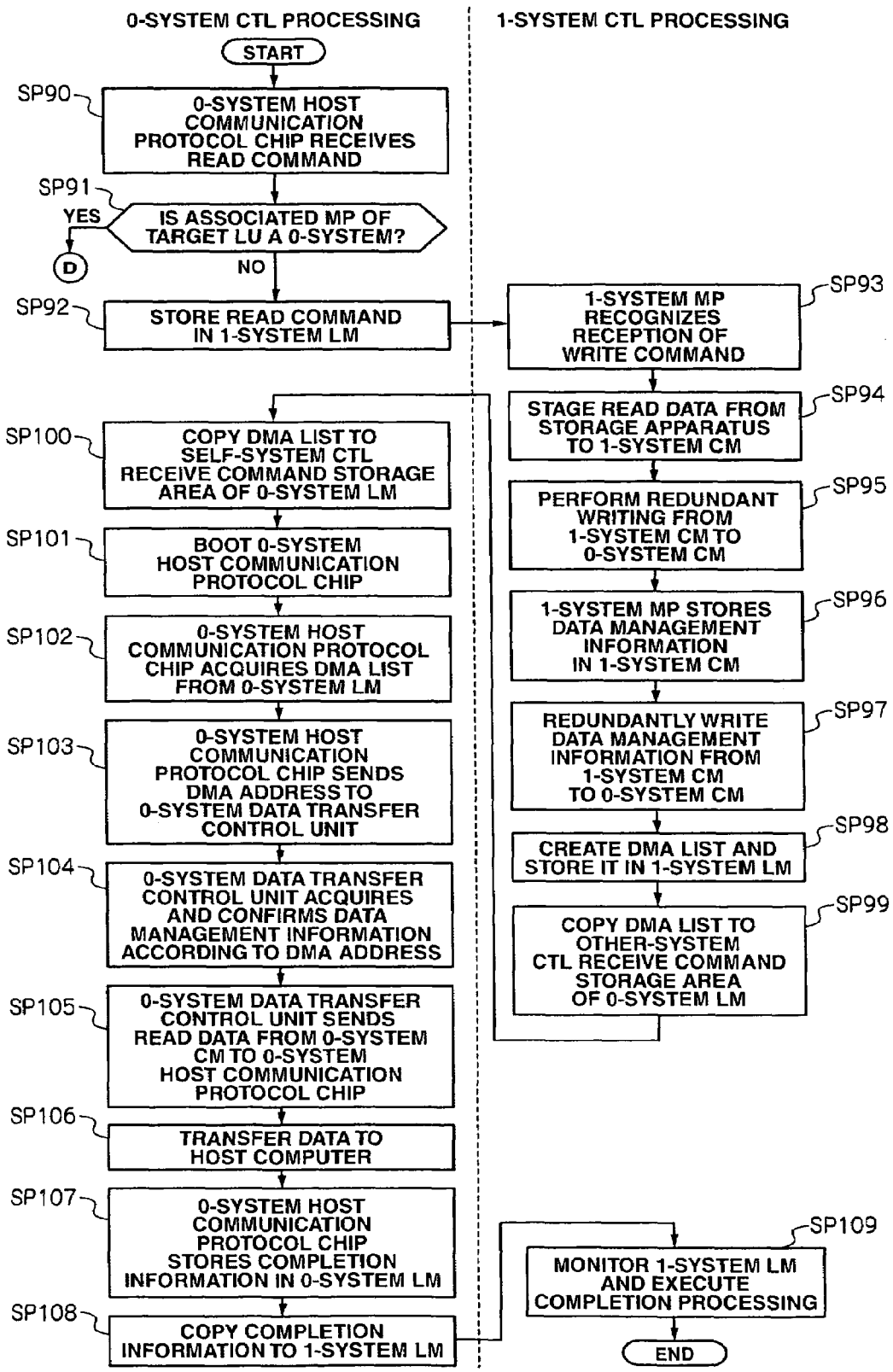
FIG. 22 is a flowchart explaining read command processing in a storage system according to another embodiment of the present invention.
Figure 23:
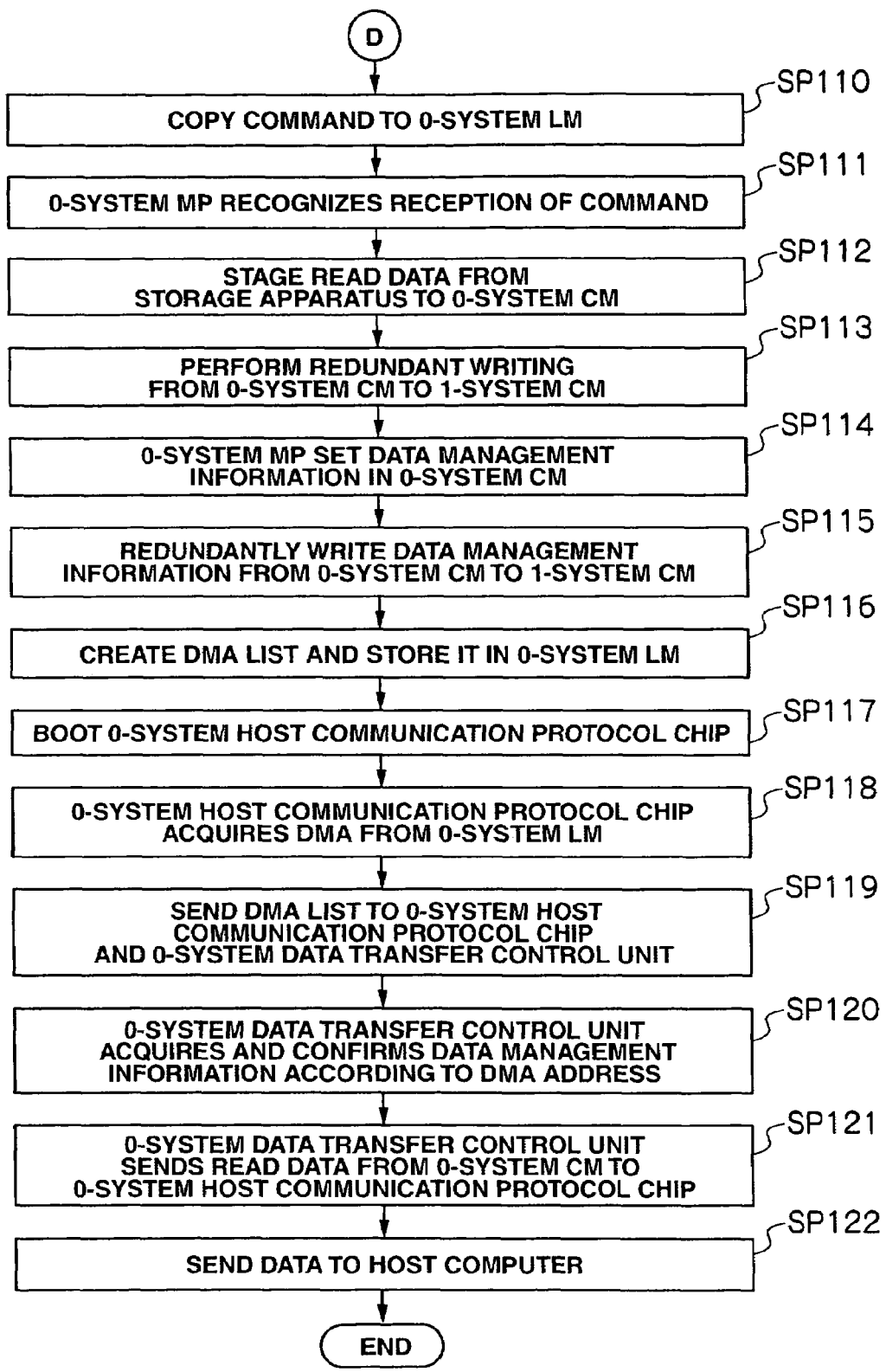
FIG. 23 is a flowchart explaining read command processing in a storage system according to another embodiment of the present invention.

Meanwhile, FIG. 21 to FIG. 23 are flowcharts showing the flow of the read command processing in the storage system 60. Here, as with the first embodiment, a case is presumed where the 0-system controller 62A receives a read command from the host computer 2A.

Figure 15:
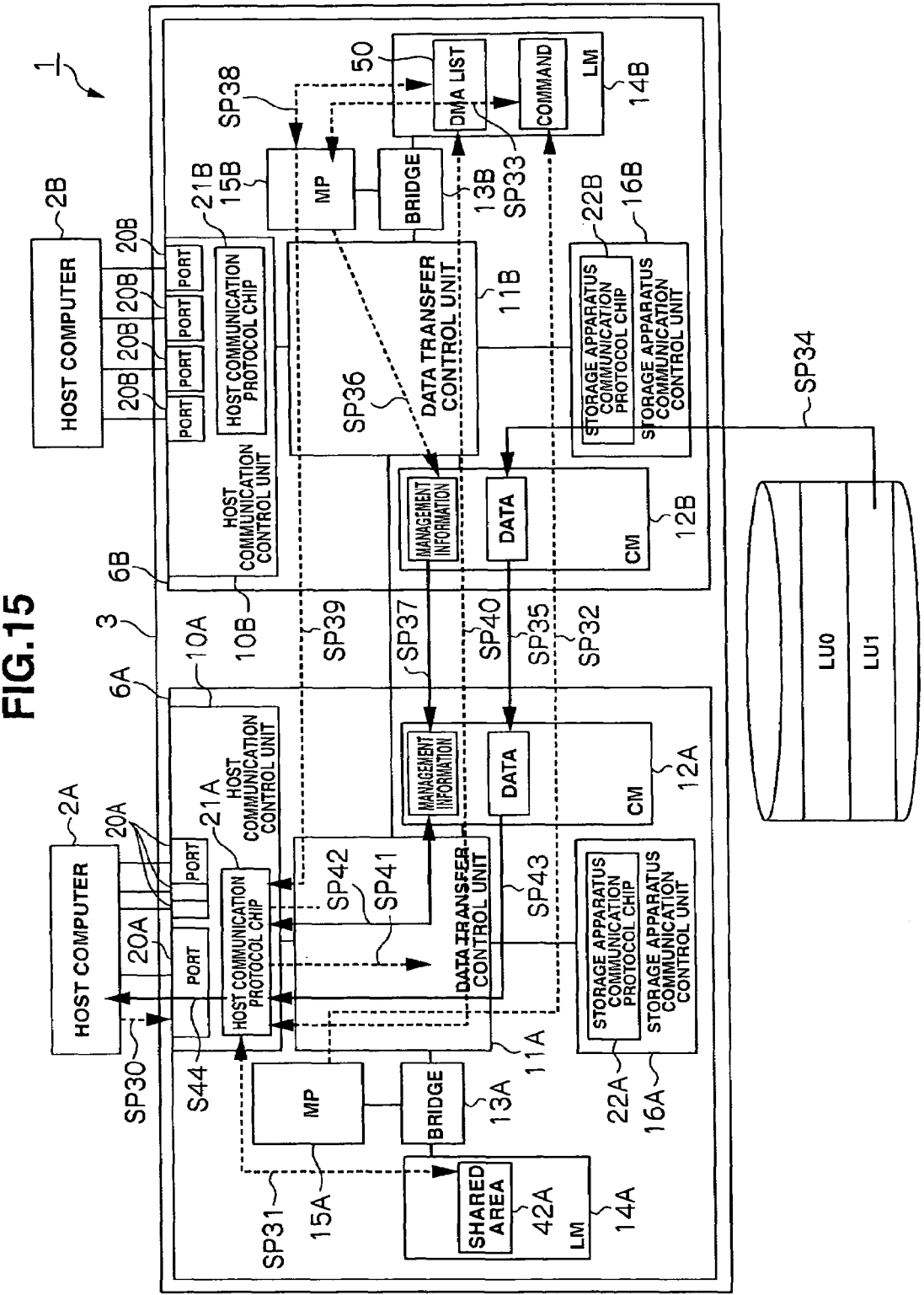
FIG. 15 is a flowchart explaining read command processing in a storage system according to an embodiment of the present invention.
Figure 17:
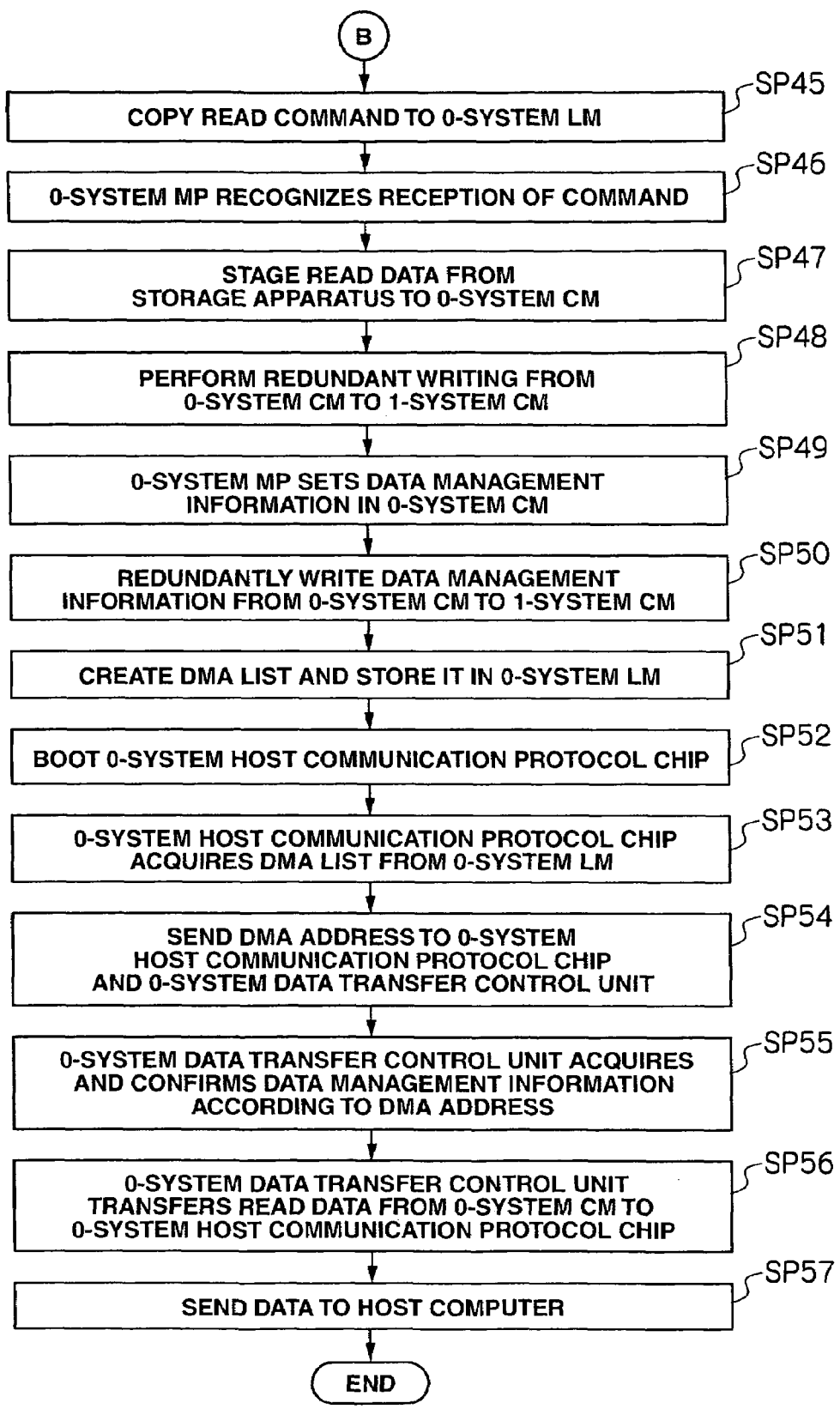
FIG. 17 is a flowchart explaining read command processing in a storage system according to an embodiment of the present invention.

In the foregoing case, with the storage system 60, as with step SP30 to step SP38 of FIG. 15 to FIG. 17, the read data according to the read request from the host computer 2A is staged from the storage apparatuses 4A to 4D to the 1-system cache memory 12B, and this read data and its management information are dual written in the 0-system and 1-system cache memories 12A, 12B. Further, with the storage system 60, the DMA list 50 in relation to this read data is created in the 1-system controller 21, and stored in the 1-system local memory 14B (SP90 to SP98).

Subsequently, the 1-system microprocessor 15B transfers the DMA list 50 stored in the local memory 14B to the 0-system local memory 14A. As a result, the DMA list 50 is stored in the control information storage area 41AX of the other-system controller receive command storage area 41A in the 0-system local memory 14A described above with reference to FIG. 4 (SP99).

The DMA list 50 stored in the 0-system local memory 14A is thereafter copied to the control information storage area 40AX (FIG. 4) of the self-system controller receive command storage area 40A in the local memory 14A (SP100).

Subsequently, the 0-system microprocessor 15A boots the 0-system host communication protocol chip 21A (SP101), and commands the host communication protocol chip 21A to perform the data transfer according to the DMA list 50 created at step SP98 (SP101).

The 0-system host communication protocol chip 64A that received the command reads the DMA list 50 from the control information storage area 40AX in the self-system controller receive command storage area 40A (FIG. 3) of the self-system local memory 14A (SP102), and notifies the DMA address to the self-system data transfer control unit 1A based on the DMA list 50 (SP103).

Further, the data transfer control unit 11A that received the notice transfers the management information of the read data to the self-system host communication protocol chip 64A according to the provided DMA address. The 0-system data transfer control unit 11A thereafter acquires the data management information according to the sent DMA address and checks the consistency thereof (SP104).

Subsequently, the 0-system data transfer control unit 11A transfers the read data from the 0-system cache memory 12A to the self-system host communication protocol chip 64A (SP105), and the host communication protocol chip 21A thereafter sends this read data to the corresponding host computer 2A (SP106). Further, when the transfer of the read data to the host computer 2A is complete, the 0-system host communication protocol chip 64A stores completion information in the self-system local memory 14A (SP107).

Subsequently, the 0-system host communication protocol chip 64A copies the completion information to the 1-system local memory 14B (SP108), and the microprocessor 15B monitoring the local memory 14B is subject to the completion processing of this completion information by the local memory 14B (SP109).

Meanwhile, when the 0-system host communication protocol chip 21A obtains a positive result in the determination at step SP31 described above, it performs the processing at step SP110 to SP122 of FIG. 23 as with the processing at step SP45 to step SP57 described above with reference to FIG. 17.

Incidentally, although a case was explained above where the 0-system controller 62A received a read command from the host computer 2A, the same applies when the 1-system controller 6B receives a read command from the host computer 2B.

As described above, with the storage system 60 according to the present embodiment, since the exchange of necessary information between the 0-system and 1-system controllers 62A, 6B is performed via the local memories 14A, 14B, write commands and read commands can be exchanged between the 0-system and 1-system controllers 62A, 6B even when the host communication protocol chip 64A in the 0-system controller 62A does not possess a multi CPU support function, and the speed-up of processing can be sought thereby.

Further, with the storage system 60, for instance, when write commands and read commands targeting a logical unit handled by the 1-system processor 15B are given from the host computer 2A to the 0-system controller 62A, in the case there it is a command to an LU handled by the other system (1 system), since the creation of the DMA list 50 and the like is conducted by the 1-system controller 6B and the processor 15A in the 0-system controller 6A only boots the self-system host communication protocol chip 64A, it is possible to alleviate the processing load of the microprocessor 15A that received the write commands and read commands from the command transfer source; that is, the host computer 2A.

Figure 24:
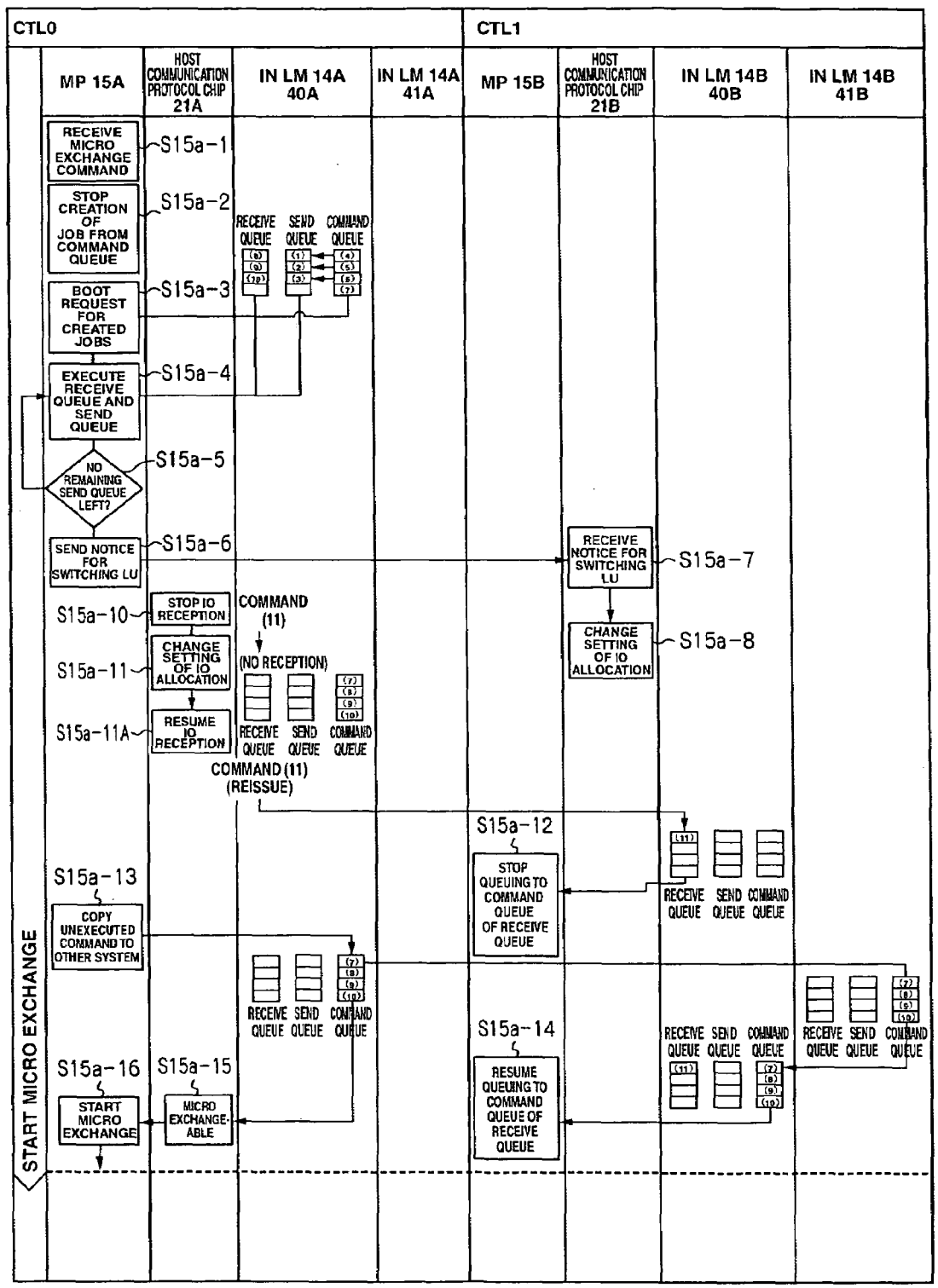
FIG. 24 is a timing chart explaining the processing for replacing a micro program of the 0-system microprocessor in the storage system of FIG. 1.
Figure 25:
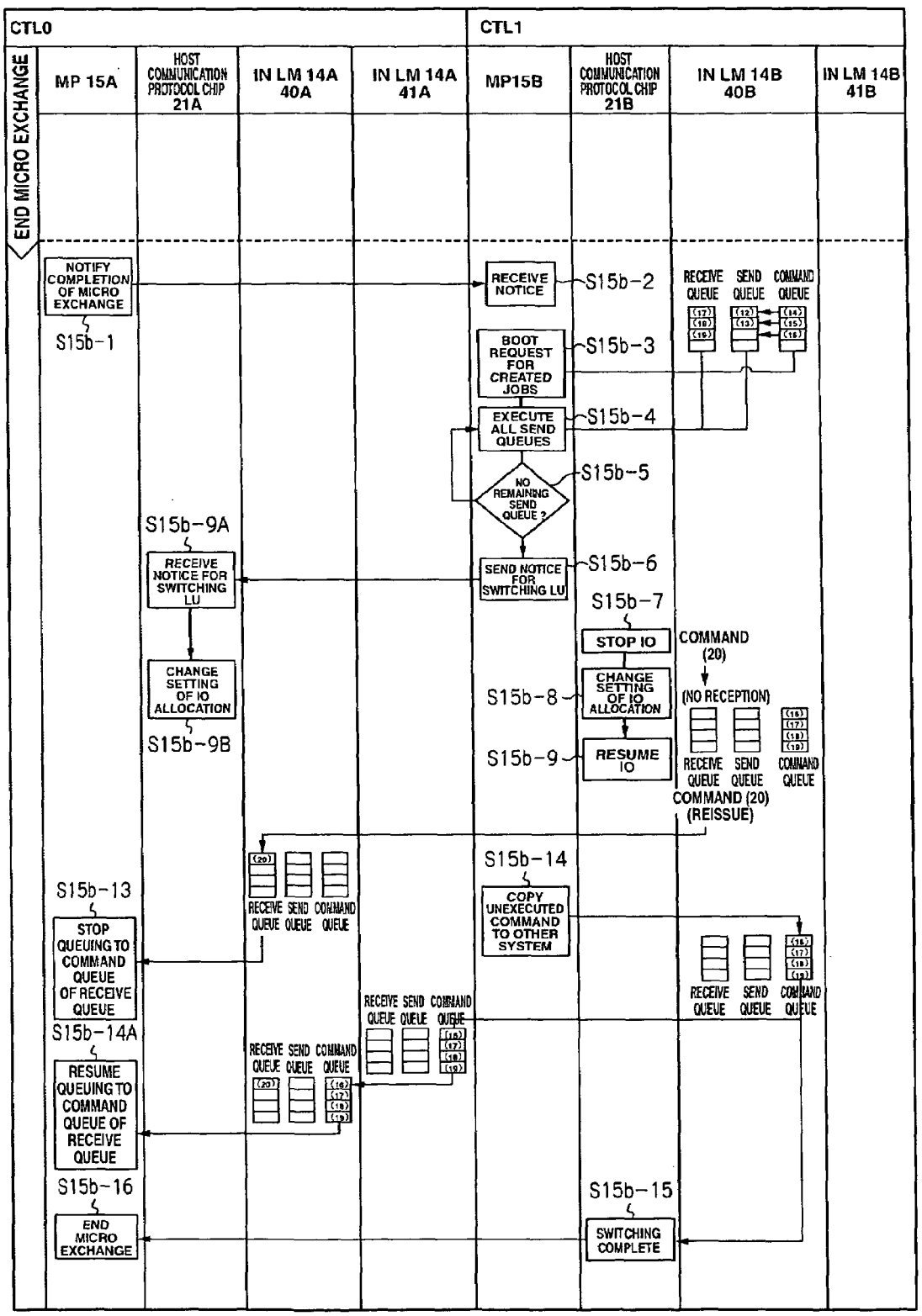
FIG. 25 is a timing chart subsequent to FIG. 24 explaining the processing for replacing a micro program of the 0-system microprocessor in the storage system of FIG. 1.

Another embodiment of the present invention is now explained. In this embodiment, replacement processing of the micro program that operates in the processors 5A, 15B is explained with reference to FIG. 24 and FIG. 25. According to the embodiment explained with reference to FIG. 1, the storage system included a plurality of storage subsystems 6A, 6B respectively comprising a controller, and commands could be transferred between the controllers. Thus, when replacing the micro program of the first processor, it was possible to continue IO from the host computer by the second microprocessor substituting the first microprocessor. FIG. 24 shows the processing process before the replacement of the micro program, and FIG. 25 shows the processing process after such replacement. Incidentally, FIG. 24 and FIG. 25 also do not differentiate the X core and the Y core, and both cores are collectively explained as processors. As with the embodiment explained above, a processor with a single core as the microprocessor is not excluded from the scope of the present invention.

Foremost, the microprocessor 15A receives a replacement command of the micro program (hereinafter sometimes referred to simply as a "micro") (S15a-1). This command may be received by the microprocessor 15A from a host computer 1000 that sends an IO command, or from a management computer or the like to be connected to the controller 6A separate from the host computer 1000.

The processor 15A that received the replacement command of the micro stops generating the job of commands stored in the command queue 202 (FIG. 2) of the controller receive storage area 40A (FIG. 4) in the local memory 14A (S15a-2). The receive queue 200 of FIG. 2 shows the queue that is sent from the host computer 2A and to store the command stored in the local memory 14A before the command analysis, the command queue 202 shows the queue to store the command to be subject to command analysis and executed internally, and the send queue shows the queue to store the command to be sent to the host computer 1000 after the execution of internal processing. The send queue is not shown in FIG. 2. Each queue is set in the control information storage areas 40AX (X core 40AXX, Y core 40AXY) of the self-system controller command storage area 40A shown in FIG. 4.

The commands stored in the receive queue are stored in the command queue after analysis, and stored in the send queue after the execution of internal processing. Although the generation of the job of commands stored in the command queue 3720 at S15a-2 will be stopped, processing in which jobs have been created are performed (S15a-3). Further, the receive queue and the send queue will respectively be executed without being stopped (S15a-4). By adopting a configuration of executing the receive queue, it is possible to ongoingly receive commands from the host computer.

After repeating the execution of the receive queue and the send queue and all commands stored in the send queue are executed (S15a-5), a communication notifying the host computer that all logical units handled by the processor 21B will be changed to the processor 15B is issued from the 0-system processor 15A to the 1-system host communication protocol, and an LU switch is commanded to the 1-system host communication protocol chip 21B (S15a-6).

Subsequently, the processor 15A notifies the host communication protocol chip 21B to stop the IO from the host (S15a-7), and thereafter changes the IO allocation setting (S15a-8). The change of the IO allocation setting, for instance, includes updating the logical unit/processor association table (FIG. 6) so that the processor 15A to handle all logical units is changed to the processor 15B, the host protocol chip 21A thereafter referring to the updated logical unit/processor association table, and changing the internal setting.

Subsequently, the host communication protocol chip resumes the IO, and starts receiving commands from the host computer 2A. Meanwhile, the host communication protocol chip 21B that received the LU switch command stops the IO (S15a-10), changes the IO allocation setting according to the routine described above (S15a-11), and resumes the IO reception (S15A-11A). Incidentally, commands sent from the host computer 2A between S15a-7 and S15a-8; that is, while the IO reception is being stopped, for instance, may be re-sent based on a timeout detection or the like of the host computer 2A. The command (command (11) of FIG. 24) re-sent from the host computer 2A is stored in the receive queue of the control information storage area in the 1-system local memory 14B without being stored in the receive queue of the control information storage area (FIG. 4) in the 0-system local memory 14A. The processor 15B issues a command so that queuing is not performed from the receive queue to the command queue in the control information storage area (S15a-12). This is in order to prevent the inconsistency caused by the switching of the data order and the destruction of such data.

After S15a-9 is ended, the processor 15A transfers the commands in the self-system controller command storage area 3710 of the local memory (LM) 14A in which the generation of jobs was stopped to the command queue of the execution processing storage area in the local memory (LM) 14B (S15a-13).

The processor 15B copies the command queue transferred at S15a-13 to the command queue in the control information storage area of the self controller receive storage area, and thereafter resumes the IO to the host computer 2A (S15a-14). Thereafter, the host communication protocol chip 21A notifies the processor 15A that it is able to perform micro replacement (S15a-15), and the processor 15A starts such micro replacement after the processing at S15a-13 is complete (S15a-16).

As a result of performing the foregoing processing, even during micro replacement processing, the host computer 2A will be able to continue issuing commands without having to perform processing of changing the host path from the controller 6A to the controller 6B. This is because after the processing at S15a-10, as with the inter-controller write/read command relay processing described above, the host communication protocol chip 21A refers to the logical unit/processor association table and the local memory address information table, and the controller communication between the controllers 6A, 6B will be executed without the mediation of the processor 15A.

Processing to be performed after micro replacement for returning the association of the logical unit to the state before micro replacement is now explained with reference to FIG. 25. When the micro replacement is complete, the processor 15A notifies the processor 15B that the replacement is complete (S15b-1, S15b-2). The processor 15B that received the notice issues a boot request to the command queue only regarding those in which jobs were generated, and does not generate jobs for the remainder (S15b-3). The receive queue and send queue are executed repeatedly (S15-4), and, when there are no more remaining send queues (S15b-5), the processor 15B issues a communication to the host communication protocol chip 21A to conduct the LU switch (S15b6).

The processor 15B thereafter issues a command to the host communication protocol chip 21B to stop the host IO, changes the IO allocation setting (returns the processing handling the LU to the state before micro replacement according to the same routine as the processing at S15a-8 before micro replacement), and, after the IO allocation setting change is complete, the host communication protocol chip 21B resumes the IO (S15b-7 to S15b-9).

Meanwhile, the host communication protocol chip 3101 notifies to execute the LU switch stops the IO, and changes the IO allocation setting as with the processing at foregoing S15a-11 (S15b-9A, S15b-9B). Further, the host computer 2A reissues the command 20 that was sent during S15b-7 to S15b-9 but did not receive a response since the IO was stopped. This command is not stored in the receive queue of the control information storage area in the self controller receive storage area of the local memory 14B, and is stored in the receive queue of the self controller receive area in the 0-system local memory 14A.

Here, the processor 15A stops the execution of the command 20 (S15b-13), copies the command queue in the control information storage area of the self controller area in the 1-system local memory 14B to the command queue in the execution processing storage area of another controller receive storage area in the 0-system local memory, and thereafter copies it to the command queue in the control information storage area of another controller receive command storage area (S15b-14). After a notice is issued from the 0-system controller to the 1-system controller indicating that the all command queues in the local memory of the 1-system controller have been copied, the processor 15A executes the command 20 in the receive queue of the control information storage area in the other-system controller receive storage area, and this command 20 is stored in the command queue after its execution. The host communication protocol chip 21A thereafter resumes the IO (S15b-14A). Further, the host communication protocol chip 21B reports the completion of the switch to the processor 1515A (S15b-15), and the micro replacement processing is thereby ended (S15b-16). Micro replacement is performed similarly in the 1-system controller.

In the foregoing processing, other than during the IO allocation setting processing in the host communication protocol chip, micro program replacement can be executed without stopping the IO. Further, it is not necessary to perform switch processing of changing the connection path between the host computer 2A and the 0-system controller 6A to the 1-system controller 6B. Thus, for example, in comparison to the method of operating path switching software on the host computer 2A and changing the path between the controller and the host computer 2A so as to replace the micro program of the processor 15A, it is possible to reduce the processing load on the host computer 2A for operating the path switching software.

Figure 26:
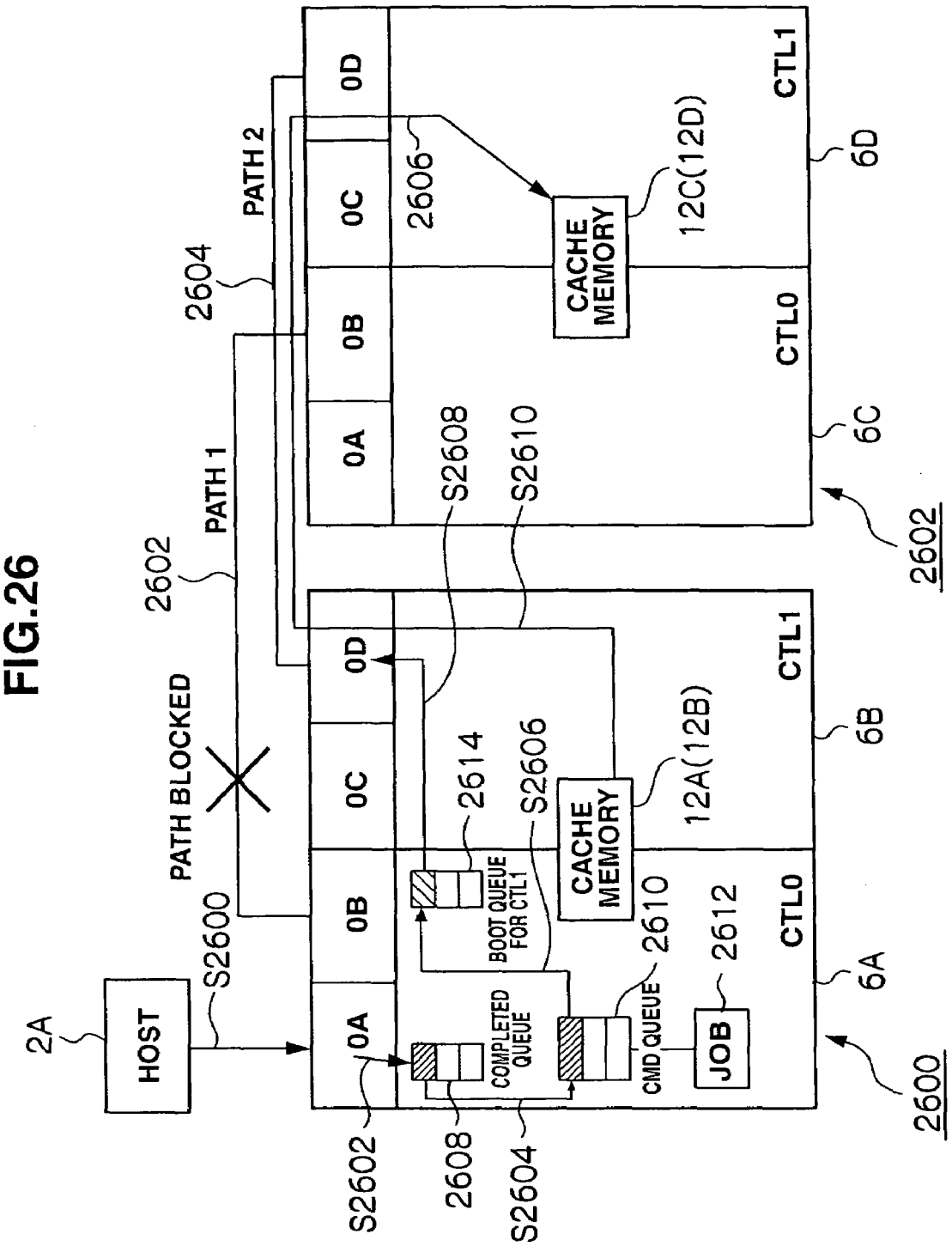
FIG. 26 is a block diagram showing an embodiment of a remote copy system using the storage subsystem according to the present invention.

FIG. 26 and FIG. 27 illustrate another embodiment according to the present invention, and relate to a remote copy system in which the storage system having the 0-system controller and the 1-system controller of the present invention is used as a main site, and the storage system having a different 0-system controller and the 1-system controller is used as a remote site. FIG. 26 and FIG. 27 show that the write command set from the host computer to the main site is transferred to the remote site via a path that is not blocked when a failure occurs and blocks the path from the port 0B of the 0-system controller of the main site to the port 0D of the 0-system controller of the remote site.

In FIG. 26, the main site 2600 is configured from the 0-system controller 6A and the 1-system controller 6B, and the remote site 2602 is configured from the 0-system controller 6C and the 1-system controller 6D. The main site is also referred to as a local site. Further, as with the explanation with reference to the other drawings, "0-system" and "11-system" are reference numbers used to differentiate two controllers. When one system is a self-system controller, the other system is another-system controller. In the embodiment shown in FIG. 26, the host communication protocol chip 21A comprises a multi CPU function, and the self-host communication protocol chip approaches the other-system host communication protocol chip 21B to make the remote site controller transfer the write commands and write data from the host computer 2A.

Processing operation of the controller 6A is now explained. The path 2602 between the port 0B of the controller 6A and the remote site-side controller 6C is blocked. Thus, the main site-side controller 6A needs to use another path to send commands and data to the path 0D of the remote site-side controller 6D.

The controller 6A receives commands and write data from the host computer 2A in the port 0A (S2600). The host protocol chip 21A of the controller 6A stores commands in the receive queue (completion Queue) of the local memory 14A (S2602). The microprocessor 15A stores commands in the command queue (CMD Queue) (S2604), and executes the job 2612 of write processing in the designated logical unit. During this process, the microprocessor 15A dual-writes the write data in the cache memories 12A and 12B.

The microprocessor 15A thereafter stores commands in the CTL1 (6B) boot queue 2614 of the local memory 14A (S2606). This boot queue is a queue in which usage is given to the dummy queue described above. A dummy queue is not a queue that stores commands to the self-system controller, and is a queue that stores commands to the other-system controller.

While performing the storage processing of commands at S2602 with one CPU, the host communication protocol chip 21A uses another CPU to send a boot queue command to the other-system controller 6B via the inter-controller communication path 5, and boots the other-system host communication protocol chip 21B to send the command from the protocol chip 21B to the remote site controller. Since the path 2602 is blocked, the host communication protocol chip 21A sends the commands to the remote site-side controller 6D via the path 2604 that is not blocked through the host communication protocol chip 21B (S2608).

The path 2604 is formed between the port 0D of the main site-side controller 6B and the port 0D of the remote site-side controller 6D, and is not blocked. Thereby, the write command sent from the host computer 2A to the controller 6A will be transferred safely to the remote site-side. Subsequently, the host communication protocol chip 21B of the main site-side controller 6B sends the write data of the cache memory 12B to the remote site-side controller 6D based on the cache address and length, and the remote site 6D-side microprocessor writes the write data in the cache memory 12D, and writes the write data in a write destination logical unit according to the write command.

Remote copy is performed from the main site to the remote site as described above. Like this, by using the dummy queue of the main site-side 0-system controller, it is possible to transfer a command sent from the host computer to the 1-system controller and the 0-system controller of the same site, and use the 1-system port to send the same command to another storage system. Conventionally, when a path to be used for data copy was blocked, a live path was used to continue performing data copy. Here, the volume mapped to the port of the blocked path needed to be switched to the volume mapped to the port of a live path in order to continue performing remote copy. Nevertheless, with the embodiment shown in FIG. 26, remote copy can be continued without having to switch the logical volume even during the blockage of a path.

The embodiment shown in FIG. 27 is now explained. This embodiment differs from the embodiment of FIG. 26 in that the host communication protocol chip 21A of the main site-side controller 6A comprises a multi CPU function. Nevertheless, the host communication protocol chip 21A of the controller 6A is not able to boot the host protocol chip 21B of the controller 6B. Thus, the microprocessor 15A of the 0-system controller 6A sends the command of the boot queue 2614 of the local memory 14A to the 1-system controller 6B, and the microprocessor 6B copies this command to its boot queue 2626 (S2620). The host protocol communication chip 21B of the controller 6B sends the command stored in the boot queue 2626 from the port 0D to the port 0D of the remote site-side controller 6D via the path 2604 (S2622). Then, the host communication protocol chip 21A transfers the write data from the cache memory 12B to the remote site-side based on the cache address and length (S2624).

Incidentally, although the foregoing embodiments described a case of applying host communication control units 10A, 63A, 10B for performing communication between the host computers 2A, 2B according to the same communication protocol as the host communication control units 10A, 62A, 10B of the 0-system and 1-system controllers 6A, 62A, 6B, the present invention is not limited thereto, and, for instance, a host communication control unit comprising a multi microprocessor function for communicating with the host computer 2A according to the FC protocol can be used in the 0-system controllers 6A, 62A, and a host communication control unit comprising a single microprocessor function for communicating with the host computer 2B according to the iSCSI protocol can be used in the 1-system controller 6B.

Further, although the foregoing embodiments described a case of applying the present invention to the storage system 1, 60 which directly connect the host computers 2A, 2B and the storage controllers 3, 61, the present invention is not limited thereto, and the present invention can also be broadly applied to storage systems that connect the host computers 2A, 2B and the storage controllers 3, 61 via a network such as a SAN (Storage Area Network) or a LAN (Local Area Network).

Moreover, although the embodiments described a case of using four storage apparatuses 4A to 4D to configure the storage systems 1, 60, the present invention is not limited thereto, and an arbitrary number of storage apparatuses 4A to 4D can be provided.

In addition, although the foregoing embodiments described a case of configuring the 0-system and 1-system controllers 10A, 62A, 10B to have the same configuration, the present invention is not limited thereto, and the 0-system and 1-system controllers 10A, 62A, 10B may be configured differently.

Further, although the foregoing embodiments explained a case where one host communication control unit 10A, 63A, 10B is provided to the 0-system and 1-system controllers 6A, 62A, 6B, respectively, the present invention is not limited thereto, and a plurality of host communication control units 10A, 63A, 10B may be provided.

We claim:

1. A storage system comprising a first storage subsystem located at a main site and a second storage subsystem located at a remote site in relation to said first storage subsystem, and remotely copying data between said first storage subsystem and said second storage subsystem,
    wherein each of the storage subsystems controls transmitting data between a host computer and a storage apparatus the provides a plurality of logical units thereon, said logical units are configured from a storage extent for reading from and writing to said host computer,
    wherein said each storage subsystem includes: a plurality of controllers each having a local memory for retaining a command sent from said host computer, and a processor for controlling the data to and from a corresponding one of the logical units based on said command retained in said local memory; and a first inter-controller connection path connecting between a self-subsystem controller and an other-subsystem controller,
    wherein said local memory stores association information of a correspondence among said logical units and said controllers, and address information of said local memory in each of said controllers of the first subsystem and the second subsystem,
    wherein, upon receiving a command sent from said host computer for a target logical unit, a self-subsystem controller determines whether the target logical unit is associated with a self-subsystem controller or an other-subsystem controller based on said association information, and when the target logical unit is associated with said other-subsystem controller, said self-subsystem controller transfers said command to said other-subsystem controller based on said address information and stores said command therein,
    wherein a storage extent for retaining a command of each of said local memories of the self-subsystem controller and the other-subsystem controller is configured with a queue structure, said queue structure includes a receive queue for retaining a command received from said host computer, and a command queue for retaining a command for said processor to access the target logical unit designated in said command, and
    wherein, when the first inter-controller connection path connecting between said self-subsystem controller and said other-subsystem controller is blocked, said processor of said self-subsystem controller of said first storage subsystem stores a boot command for said another self-subsystem controller of said first storage subsystem in the queue of said local memory of said self-subsystem controller and copies the boot command for said another self-subsystem controller into a queue of said local memory of said another self-subsystem controller, and then said another self-subsystem controller sends a command for accessing data to said another other-subsystem controller of said second storage subsystem via a second inter-controller connection path connecting between another self-subsystem controller and another other-subsystem controller.

2. The storage system according to claim 1, wherein said processor of each of said controllers is configured from a plurality of cores.

3. The storage system according to claim 2,
    wherein said local memory stores association information representing a correspondence between said plurality of logical units and said plurality of cores; and
    wherein each of said plurality of cores processes said command to a corresponding one of the logical units to be handled by a self core based on said association information and executes I/O processing of said data to said corresponding logical unit.

4. The storage system according to claim 3, wherein a storage extent for storing said command of said local memory is configured from a queue structure, said queue structure comprises a plurality of queues, and each queue is allocated to a specific core among said plurality of cores.

5. The storage system according to claim 4, wherein said queue structure comprises a receive queue for storing said command received by said controller, and a command queue for storing said command to be executed by each of said cores.

6. The storage system according to claim 5, wherein said receive queue is set to each port among a plurality of ports provided to said controller in relation to said host computer, and said command queue is set to each core among said plurality of cores.

7. The storage system according to claim 6, wherein each core of said plurality of cores is allocated to said receive queue.

8. The storage system according to claim 7, wherein said local memory comprises second association information of a correspondence among said plurality of receive queues, said plurality of command queues, and said plurality of cores, and each core of said plurality of cores processes commands stored in said receive queue and said command queue handled by a self core based on said second association information.

9. The storage system according to claim 8, wherein each command queue of said plurality of command queues is allocated to a target logical unit among said plurality of logical units, and each core of said plurality of cores processes the input and output of said data to and from said target logical unit based on a command stored in said command queue.

10. The storage system according to claim 3, wherein said local memory of said self-subsystem controller comprises a dummy queue for storing said command to be executed by said core of said processor of said other-subsystem controller.

11. The storage system according to claim 3, said core belonging to said self-subsystem controller is made to be a primarily associated core for processing a command from said host computer, and control information for replacing said primarily associated core with said core belonging to said another self-subsystem controller is stored in said local memory of said self-subsystem controller.

12. The storage system according to claim 1, wherein said self-subsystem controller transfers a command in a receive queue of said local memory thereof to a command queue of said local memory thereof, and said processor of said self-subsystem controller accesses data in cache memories of the self-subsystem controllers.

13. The storage system according to claim 12, wherein when the first inter-controller connection path functions normally, said processor of said self-subsystem controller stores a boot command for said self-subsystem controller in a queue of said local memory of said self-subsystem controller, and then sends a command for accessing data to said other-subsystem controller.

14. The storage system according to claim 1, wherein said cache memory is provided independently with a first data storage extent for storing said data from said host computer or said storage apparatus as received by said self-subsystem controller, and a second data storage extent for storing said data copied by said other-subsystem controller.

15. The storage system according to claim 1, wherein said self-subsystem controller transfers a command in a receive queue of said local memory thereof to a command queue of said local memory of other-subsystem controller, and said processor of said other-subsystem controller processes said command retained in a command queue thereof.

16. The storage system according to claim 1, wherein said self-subsystem controller copies a command retained in a receive queue of said local memory thereof to a dummy queue of said local memory of said another self-subsystem controller, and said processor of said another self-subsystem controller periodically performs polling to said dummy queue and stores said command in a command queue thereof.

17. The storage system according to claim 1, wherein said local memory of said self-subsystem controller and said local memory of said another self-subsystem controller respectively have a plurality of said command queues, and have information regarding the correspondence between the respective command queues of each of said local memories and each of said logical units.

18. The storage system according to claim 1, wherein said processor of said self-subsystem controller transfers a command to be processed by said controller to said processor of said another self-subsystem controller, and a control program to said processor of said self-system controller is newly replaced.

19. The storage system according to claim 1, wherein each of said controllers comprises a cache memory for temporarily storing data sent and received between said host computer and said storage apparatus,
wherein data stored in the cache memory of said other-subsystem controller is copied to said cache memory of said self-subsystem controller; and
wherein said self-subsystem controller uses data copied to said cache memory of said self-subsystem controller to control the data transfer between said host computer and the cache memory of said self-subsystem controller.

20. The storage system according to claim 1, wherein said local memory is provided independently with a first storage extent for storing said command from said host computer targeting said logical unit associated with said self-subsystem controller and which was received by said self-subsystem controller, and a second storage extent for storing said command from said host computer targeting said logical unit associated with said self-subsystem controller and which was transferred from said other-subsystem controller.

* * * * *